US012485126B2

United States Patent
Maraver et al.

(10) Patent No.: US 12,485,126 B2
(45) Date of Patent: Dec. 2, 2025

(54) COMBINATION FOR TREATING CANCER

(71) Applicants: INSERM (Institut National de la Santé et de la Recherche Médicale), Paris (FR); Université de Montpellier, Montpellier (FR); Institut Régional du Cancer de Montpellier, Montpellier (FR)

(72) Inventors: Antonio Maraver, Montpellier (FR); Emilie Bousquet, Montpellier (FR)

(73) Assignees: INSERM (INSTITUT NATIONAL DE LA SANTÉ ET DE LA RECHERCHE MÉDICALE), Paris (FR); Université de Montpellier, Montpellier (FR); Institut Régional du Cancer de Montpellier, Montpellier (FR)

( * ) Notice: Subject to any disclaimer, the term of this patent is extended or adjusted under 35 U.S.C. 154(b) by 882 days.

(21) Appl. No.: 17/260,388

(22) PCT Filed: Jul. 18, 2019

(86) PCT No.: PCT/EP2019/069418
§ 371 (c)(1),
(2) Date: Jan. 14, 2021

(87) PCT Pub. No.: WO2020/016377
PCT Pub. Date: Jan. 23, 2020

(65) Prior Publication Data
US 2021/0290633 A1    Sep. 23, 2021

(30) Foreign Application Priority Data

Jul. 19, 2018  (EP) ..................................... 18305991

(51) Int. Cl.
| A61K 31/55 | (2006.01) |
| A61K 31/417 | (2006.01) |
| A61K 31/501 | (2006.01) |
| A61K 31/506 | (2006.01) |
| A61K 31/519 | (2006.01) |
| A61K 31/52 | (2006.01) |
| A61K 31/5377 | (2006.01) |
| A61K 45/06 | (2006.01) |
| A61P 35/00 | (2006.01) |

(52) U.S. Cl.
CPC ............ *A61K 31/55* (2013.01); *A61K 31/417* (2013.01); *A61K 31/501* (2013.01); *A61K 31/506* (2013.01); *A61K 31/519* (2013.01); *A61K 31/52* (2013.01); *A61K 31/5377* (2013.01); *A61K 45/06* (2013.01); *A61P 35/00* (2018.01)

(58) Field of Classification Search
CPC .... A61K 31/55; A61K 31/417; A61K 31/501; A61K 31/506; A61K 31/519; A61K 31/52; A61K 31/5377; A61K 45/06; A61P 35/00
See application file for complete search history.

(56) References Cited

U.S. PATENT DOCUMENTS

2011/0166028 A1 * 7/2011 Bergstrom ........... C12Q 1/6886
435/7.1

FOREIGN PATENT DOCUMENTS

WO        2012/097054 A1    7/2012

OTHER PUBLICATIONS

Diluvio, G., Del Gaudio, F., Giuli, M.V. et al. NOTCH3 inactivation increases triple negative breast cancer sensitivity to gefitinib by promoting EGFR tyrosine dephosphorylation and its intracellular arrest. Oncogenesis 7, 42 (2018). (Year: 2018).*
Wang, S., Cang, S. & Liu, D. Third-generation inhibitors targeting EGFR T790M mutation in advanced non-small cell lung cancer. J Hematol Oncol 9, 34 (2016). (Year: 2016).*
Pancewicz-Wojtkiewicz J. Epidermal growth factor receptor and notch signaling in non-small-cell lung cancer. Cancer Med. Dec. 2016;5(12):3572-3578. doi: 10.1002/cam4.944. Epub Oct. 21, 2016 (Year: 2016).*
Tan, CS., Kumarakulasinghe, N.B., Huang, YQ. et al. Third generation EGFR TKIs: current data and future directions. Mol Cancer 17, 29 (2018). (Year: 2018).*
RO4929097 and erlotinib hydrochloride in treating patients with stage IV or recurrent non-small cell lung cancer; ClinicalTrials.gov ID: NCT01193881 (Year: 2015).*
Xie et al; "[gamma] Secretase inhibitor BMS-708163 reverses resostamce tp EGFR inhibitor via the P13K/Akt pathway in lung cancer"; Journal of Cellular Biochemistry, vol. 116, No. 6, Jun. 2015, pp. 1019-1027.

(Continued)

*Primary Examiner* — Clinton A Brooks
*Assistant Examiner* — Josmalen M. Ramos-Lewis
(74) *Attorney, Agent, or Firm* — WCF IP

(57) ABSTRACT

The present invention relates to the treatment of cancer and particularly of lung cancer. In the present study, the inventors analyzed the role of the Notch pathway in EGFR-driven lung adenocarcinoma (LUAD) using complex genetic mouse models and patient derived xenografts. They found that, similarly to KRAS-driven LUAD, EGFR-driven LUAD shows both Notch pathway hyperactivation and addiction to its activity. Importantly, combination of EGFR tyrosine Kinase Inhibitors (TKIs) with Notch inhibition re-sensitizes LUAD cells harboring gatekeeper mutations $EGFR^{T790M}$ or $EGFR^{C797S}$ to gefitinib and osimertinib, respectively. Moreover, they show that pSTAT3, which is known to increase upon EGFR TKI treatment, directly binds to the HES1 promoter and represses HES1 expression. Finally, high HES1 expression levels correlate with shorter progression free survival and its expression increases upon progression in EGFR mutated patients under TKI treatment. Thus, the present invention relates to a combination of a tyrosine-kinase inhibitor (TKI) against epidermal growth factor receptor (EGFR) and an inhibitor of the Notch signalling pathway for use in the treatment of a cancer in a subject in need thereof.

4 Claims, 4 Drawing Sheets

(56) References Cited

OTHER PUBLICATIONS

Figure 1A:
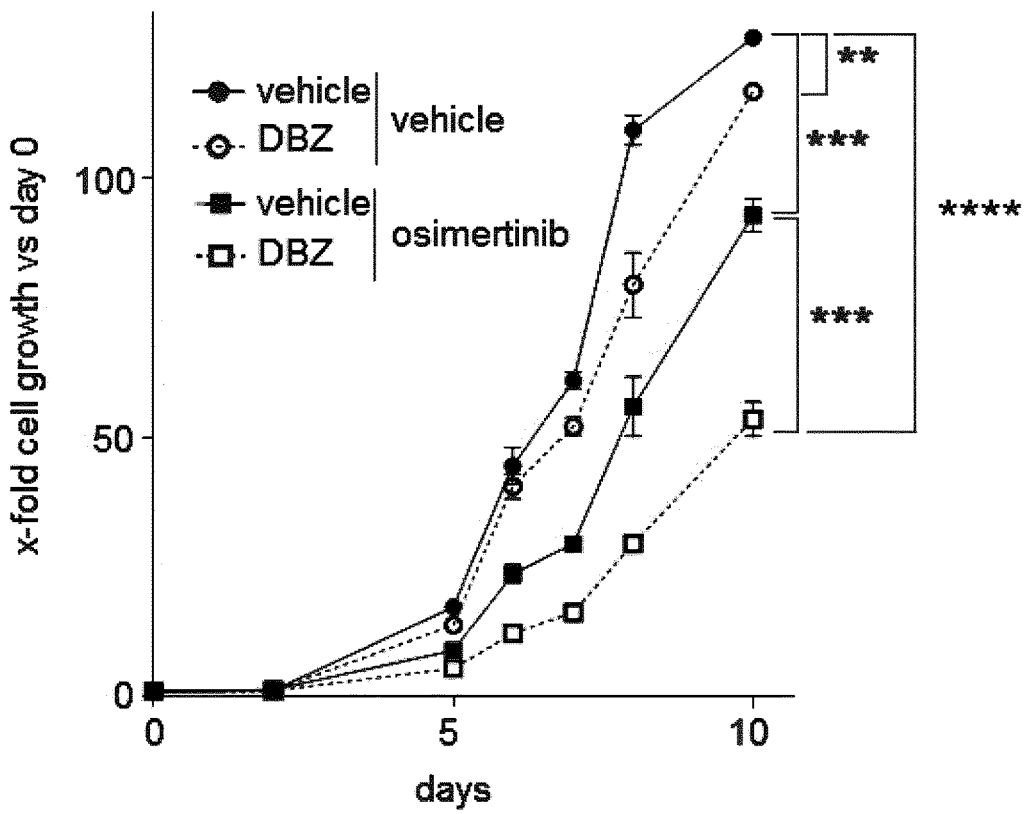

Xie et al.; "Notch-1 contributes to epidermal growth factor receptor tyrosine kinase inhibitor acquired resistance in non-smallcell lung cancer in vitro and in vivo"; European Journal of Cancer, vol. 49, No. 16 Nov. 2013, pp. 3559-3572.
Staberg et al.; Combined EGFR- and notch inhibitiondisplay additive inhibitory effect on glioblastoma cell viability and glioblastoma-induced endothelial cell sprouting in vitro; Cancer Cell International, vol. 16, 2016, p. 34.
Remon et al; "Osimertinib and other third-generation EGFR TLO om EGFR-mutant NSCLC patients"; Annals of Oncology: Official Journal of the European Society for Medical Oncology, vol. 29, No. suppl 1, Jan. 1, 2018, pp. i20-i27.
Espinosa et al.; "Notch inhibitors for cancer treatment"; Pharmacology and Therapeutics vol. 139, No. 2, Feb. 28, 2013. pp. 95-110.

\* cited by examiner

COMBINATION FOR TREATING CANCER

FIELD OF THE INVENTION

The present invention relates to a combination of a tyrosine-kinase inhibitor (TKI) against epidermal growth factor receptor (EGFR) and an inhibitor of the Notch signalling pathway for use in the treatment of a cancer in a subject in need thereof.

BACKGROUND OF THE INVENTION

Lung cancer kills about a million people every year worldwide, and it is estimated that during the $21^{st}$ century over 250 million people will die from this aggressive disease. Lung adenocarcinoma (LUAD) accounts for around 40% of all lung cancer (1). Importantly, the life expectancy of LUAD patients harboring EGFR activating mutations, has dramatically improved thanks to the development of tyrosine kinase inhibitors (TKIs) (2). Patients treated with first generation TKIs (i.e. gefitinib or erlotinib) as first line treatment show overall good responses, however, these tumors become generally resistant to the targeted therapy after less than one year of treatment. This phenotype can be explained by the acquisition of the gatekeeper $EGFR^{T790M}$ mutation that occurs in about 60% of the cases (3). More recently, new TKIs that target specifically the $EGFR^{T790M}$ were developed. The more advanced one, AZD9291 (i.e. osimertinib), showed a very good response in patients harboring this gatekeeper mutation (4). Unfortunately, tumors from patients under osimertinib treatment become resistant to this drug too by a variety of mechanisms, including the acquisition of a new gatekeeper mutation ($EGFR^{C797S}$) (5). The Notch signaling pathway plays a major role in different types of cancers including LUAD (6). In particular, through the use of genetically engineered mouse models (GEMMs), the inventors previously showed that the Notch pathway is critical for KrasG12V-driven LUAD formation and maintenance (7). Previous studies using cell lines and subcutaneous xenografts have shown that the EGFR and Notch pathways show a complex crosstalk, and combination of Notch inhibitors and EGFR TKIs in LUAD cells sensitive to EGFR TKIs led to better responses than those observed with any of the treatments alone (8-10). However, the effect of this combination in primary endogenous EGFR-driven LUADs in their natural environment or the role of the Notch pathway in already acquired TKI relapse produced by gatekeeper mutations remains largely unknown. Although significant efforts have been made in order to develop better therapeutic options for EGFR-driven LUAD, tumors under single-agent treatments invariably relapse due to the development of EGFR gatekeeper mutations in a high percentage of cases.

SUMMARY OF THE INVENTION

In the present study, the inventors analyzed the role of the Notch pathway in EGFR-driven lung adenocarcinoma (LUAD) using complex genetic mouse models and patient derived xenografts. They found that, similarly to KRAS-driven LUAD, EGFR-driven LUAD shows both Notch pathway hyperactivation and addiction to its activity. Importantly, combination of EGFR tyrosine Kinase Inhibitors (TKIs) with Notch inhibition re-sensitizes LUAD cells harboring gatekeeper mutations $EGFR^{T790M}$ or $EGFR^{C797S}$ to gefitinib and osimertinib, respectively. Mechanistically, when combined with Notch inhibition, treatment with TKIs led to synergistically reduced HES1 protein levels. Moreover, they show that pSTAT3, which is known to increase upon EGFR TKI treatment, directly binds to the HES1 promoter and represses HES1 expression. Finally, high HES1 expression levels correlate with shorter progression free survival and its expression increases upon progression in EGFR mutated patients under TKI treatment. Their results offer a rationale to combine EGFR TKIs and Notch pathway inhibitors in EGFR mutant LUAD patients with gatekeeper resistant mutations against TKIs.

Thus, the present invention relates to a combination of a tyrosine-kinase inhibitor (TKI) against epidermal growth factor receptor (EGFR) and an inhibitor of the Notch signalling pathway for use in the treatment of a cancer in a subject in need thereof. Particularly, the invention is defined by its claims.

DETAILED DESCRIPTION OF THE INVENTION

A first object of the present invention relates to a combination of a tyrosine-kinase inhibitor (TKI) against epidermal growth factor receptor (EGFR) and an inhibitor of the Notch signalling pathway for use in the treatment of a cancer in a subject in need thereof.

According to the invention, the TKI can be a TKI of first, second or third generation.

In another embodiment, the invention relates to i) a tyrosine-kinase inhibitor (TKI) against epidermal growth factor receptor (EGFR) and ii) an inhibitor of the Notch signalling pathway, as a combined preparation for simultaneous, separate or sequential use in the treatment of cancer in a subject in need thereof.

In another particular embodiment, the invention relates to a tyrosine-kinase inhibitor (TKI) against epidermal growth factor receptor (EGFR) and ii) an inhibitor of the Notch signalling pathway as a combined preparation for simultaneous use in the treatment of cancer.

The invention also relates to a combination of a tyrosine-kinase inhibitor (TKI) against epidermal growth factor receptor (EGFR) and an inhibitor of the Notch signalling pathway for use in the treatment of a cancer in a subject in need thereof.

According to the invention, the TKI of first generation can be selected in the group consisting but not limited to erlotinib, sunitinib, imatinib and gefitinib According to the invention, the TKI of second generation can be selected in the group consisting but not limited to afatinib, dasatinib, nilotinib, bosutinib, and pazopanib.

In a particular embodiment, the present invention relates to the combination of tyrosine-kinase inhibitor (TKI) of third generation against epidermal growth factor receptor (EGFR) and an inhibitor of the Notch signalling pathway for use in the treatment of a cancer in a subject in need thereof.

In another embodiment, the invention relates to i) a tyrosine-kinase inhibitor of third generation against epidermal growth factor receptor (EGFR) and ii) an inhibitor of the Notch signalling pathway, as a combined preparation for simultaneous, separate or sequential use in the treatment of cancer in a subject in need thereof.

In another particular embodiment, the invention relates to a tyrosine-kinase inhibitor of third generation against epidermal growth factor receptor (EGFR) and ii) an inhibitor of the Notch signalling pathway as a combined preparation for simultaneous use in the treatment of cancer.

The invention also relates to a combination of a tyrosine-kinase inhibitor of third generation against epidermal growth factor receptor (EGFR) and an inhibitor of the Notch signalling pathway for use in the treatment of a cancer in a subject in need thereof.

As used herein, the term "tyrosine-kinase (TK)" has its general meaning in the art and denotes pharmaceutical drug that inhibits tyrosine kinases. Tyrosine kinases are enzymes responsible for the activation of many proteins by signal transduction cascades. The proteins are activated by adding a phosphate group to the protein (phosphorylation), a step that TKIs inhibit. TKIs are typically used as anticancer drugs. Notch ligands are divided into two subclasses: the Delta family and the Serrate/Jagged family. In mammals, two members of the Serrate family, Jagged (Jag)-1 and -2, and three members of the Delta family, Delta 1 (Dll1), Delta 3 (Dll3) and Delta 4 (Dll4), have been identified.

As used herein, the term "EGFR" for "Epidermal Growth Factor Receptor" is a well-known transmembrane protein that is a receptor for members of the epidermal growth factor family (EGF family) of extracellular protein ligands. The epidermal growth factor receptor is a member of the ErbB family of receptors, a subfamily of four closely related receptor tyrosine kinases: EGFR (ErbB-1), HER2/neu (ErbB-2), Her 3 (ErbB-3) and Her 4 (ErbB-4). In many cancer types, mutations affecting EGFR expression or activity could result in cancer.

As used herein, the term "notch signalling pathway" has its general meaning in the art and denotes a cell signaling system present in most multicellular organisms. Mammals possess four different notch receptors, referred to as NOTCH1, NOTCH2, NOTCH3, and NOTCH4. The notch receptor is a single-pass transmembrane receptor protein. It is a hetero-oligomer composed of a large extracellular portion, which associates in a calcium-dependent, non-covalent interaction with a smaller piece of the notch protein composed of a short extracellular region, a single transmembrane-pass, and a small intracellular region.

As used herein, the term "tyrosine-kinase inhibitor (TKI) against epidermal growth factor receptor (EGFR)" denotes molecules or compound which can inhibit the activity of the kinase of the EGFR (e.g. inhibit the kinase, activity of the protein) or a molecule or compound which destabilizes the kinase of the EGFR. The term "tyrosine-kinase inhibitor (TKI) against epidermal growth factor receptor (EGFR)" also denotes inhibitors of the expression of the gene coding for the EGFR kinase. TKI of first, second or third generation against epidermal growth factor receptor (EGFR)" denotes molecules or compound which can inhibit the activity of the kinase of the EGFR even with mutations in EGFR like $EGFR^{T790M}$ and $EGFR^{C797S}$. These molecules denotes inhibitors of the expression of the gene coding for the EGFR kinase.

Particularly, a TKI of third generation against EGFR is a molecule which can be used when there is at least a mutation $EGFR^{T790M}$ and/or $EGFR^{C797S}$ As used herein, the term "inhibitor of the Notch signalling pathway" denotes all molecules which inhibits the activity and the expression of the four receptors: NOTCH1, NOTCH2, NOTCH3, and NOTCH4 or the ligand of the Notch receptors (like the Delta family and the Serrate/Jagged family see below). The term "inhibitor of the notch signalling pathway" also denotes inhibitors of the expression of the gene coding for the four receptors or the ligand pf Notch receptors.

According to the invention, the cancer may be selected in the group consisting of adrenal cortical cancer, anal cancer, bile duct cancer, bladder cancer, bone cancer, brain and central nervous system cancer, breast cancer, Castleman disease, cervical cancer, colorectal cancer, endometrial cancer, esophagus cancer, gallbladder cancer, gastrointestinal carcinoid tumors, Hodgkin's disease, non-Hodgkin's lymphoma, Kaposi's sarcoma, kidney cancer, laryngeal and hypopharyngeal cancer, liver cancer, lung cancer, mesothelioma, plasmacytoma, nasal cavity and paranasal sinus cancer, nasopharyngeal cancer, neuroblastoma, oral cavity and oropharyngeal cancer, ovarian cancer, pancreatic cancer, penile cancer, pituitary cancer, prostate cancer, retinoblastoma, rhabdomyosarcoma, salivary gland cancer, skin cancer, stomach cancer, testicular cancer, thymus cancer, thyroid cancer, vaginal cancer, vulvar cancer, and uterine cancer.

In a particular embodiment, the cancer is a lung cancer, a lung adenocarcinoma, a EGFR-driven lung adenocarcinoma (LUAD) or a lung resistant cancer.

In a particular embodiment, the cancer is a lung cancer having at least one mutation in EGFR selected in the group consisting in $EGFR^{T790M}$ and $EGFR^{C797S}$.

As used herein, the term "subject" denotes a mammal, such as a rodent, a feline, a canine, and a primate. Particularly, the subject according to the invention is a human. Particularly, the subject can suffer from a cancer and particularly a lung cancer.

As used herein, the term "treatment" or "treat" refer to both prophylactic or preventive treatment as well as curative or disease modifying treatment, including treatment of subjects at risk of contracting the disease or suspected to have contracted the disease as well as subjects who are ill or have been diagnosed as suffering from a disease or medical condition, and includes suppression of clinical relapse. The treatment may be administered to a subject having a medical disorder or who ultimately may acquire the disorder, in order to prevent, cure, delay the onset of, reduce the severity of, or ameliorate one or more symptoms of a disorder or recurring disorder, or in order to prolong the survival of a subject beyond that expected in the absence of such treatment. By "therapeutic regimen" is meant the pattern of treatment of an illness, e.g., the pattern of dosing used during therapy. A therapeutic regimen may include an induction regimen and a maintenance regimen. The phrase "induction regimen" or "induction period" refers to a therapeutic regimen (or the portion of a therapeutic regimen) that is used for the initial treatment of a disease. The general goal of an induction regimen is to provide a high level of drug to a subject during the initial period of a treatment regimen. An induction regimen may employ (in part or in whole) a "loading regimen", which may include administering a greater dose of the drug than a physician would employ during a maintenance regimen, administering a drug more frequently than a physician would administer the drug during a maintenance regimen, or both. The phrase "maintenance regimen" or "maintenance period" refers to a therapeutic regimen (or the portion of a therapeutic regimen) that is used for the maintenance of a subject during treatment of an illness, e.g., to keep the subject in remission for long periods of time (months or years). A maintenance regimen may employ continuous therapy (e.g., administering a drug at a regular intervals, e.g., weekly, monthly, yearly, etc.) or intermittent therapy (e.g., interrupted treatment, intermittent treatment, treatment at relapse, or treatment upon achievement of a particular predetermined criteria [e.g., disease manifestation, etc.]).

According to the invention, tyrosine-kinase inhibitor (TKI) of third generation against epidermal growth factor receptor (EGFR) is selected in the group consisting in but not limited to osimertinib, rociletinib, axitinib, tivozanib, HM61713, ASP8273, EGF816, and PF-06747775.

According to the invention, Notch inhibitors are well-known in the art and any Notch inhibitors, including gamma-secretase inhibitors, which have been described in the art, may be used for the purpose of the invention. (see for example U.S. Pat. Nos. 5,703,129; 6,448,229; 6,683,091; 6,756,511; 6,890,956; 6,984,626; 6,995,155; WO 01/70677; WO 02/081435; WO 03/018543; WO 00/50391; WO 03/0422646; WO 03/041735; U.S. published application 2005-0227973; 2006-0030694; 2006-0004004; 2006-0009467; 2005-0261276; 2005-0143369; and 2005-0075320, all of which are hereby incorporated by reference. Others Notch inhibitors are well described for example in the articles Bellavia D et al 2018 and Ristorcelli E; et al 2010.

In one embodiment, the inhibitor of Notch according to the invention may be a low molecular weight compound, e. g. a small organic molecule (natural or not).

The term "small organic molecule" refers to a molecule (natural or not) of a size comparable to those organic molecules generally used in pharmaceuticals. The term excludes biological macromolecules (e. g., proteins, nucleic acids, etc.). Preferred small organic molecules range in size up to about 10000 Da, more preferably up to 5000 Da, more preferably up to 2000 Da and most preferably up to about 1000 Da.

According to the invention, Notch inhibitors can be selected in the group consisting in but not limited to inhibitors of the TNFα converting enzymes (TACE inhibitors), including ADAM10 and ADAM17 (Moss et al, 2008, Curr Pharm Biotechnol. 9:2-8), and gamma-secretase inhibitors (GSI) (DeStrooper et al, 1999, Nature 398:518-522) which inhibit Notch receptor activation by inhibiting proteolytic cleavage of the Notch receptor.

Such inhibitors can be selected in the group consisting in but not limited to nirogacestat (SpringWorks Therapeutics), crenigacestat (LY-3039478, Eli Lilly), avagacestat (Merck), diaminopropanol tetraacetic acid (DAPT), RG-4733 (Roche), MK-0752 (Merck), SAHM1, FLI-06, IMR-1, dibenzazepine (DBZ), PF-3,084,014, BMS-906,024, LY450139 or LY411575 (see for example Bellavia D et al 2018 and Ristorcelli E; et al 2010).

In one embodiment, the inhibitor on Notch is Nirogacestat.

In one embodiment, the inhibitor on Notch is an antibody. Antibodies directed against Notch receptors or Notch ligands can be raised according to known methods by administering the appropriate antigen or epitope to a host animal selected, e.g., from pigs, cows, horses, rabbits, goats, sheep, and mice, among others. Various adjuvants known in the art can be used to enhance antibody production. Although antibodies useful in practicing the invention can be polyclonal, monoclonal antibodies are preferred. Monoclonal antibodies against Notch receptors or Notch ligands can be prepared and isolated using any technique that provides for the production of antibody molecules by continuous cell lines in culture. Techniques for production and isolation include but are not limited to the hybridoma technique originally described by Kohler and Milstein (1975); the human B-cell hybridoma technique (Cote et al., 1983); and the EBV-hybridoma technique (Cole et al. 1985). Alternatively, techniques described for the production of single chain antibodies (see e.g., U.S. Pat. No. 4,946,778) can be adapted to produce anti-Notch receptors or anti-Notch ligands single chain antibodies. Compounds useful in practicing the present invention also include anti-Notch receptors or anti-Notch ligands antibody fragments including but not limited to F(ab')2 fragments, which can be generated by pepsin digestion of an intact antibody molecule, and Fab fragments, which can be generated by reducing the disulfide bridges of the F(ab')2 fragments. Alternatively, Fab and/or scFv expression libraries can be constructed to allow rapid identification of fragments having the desired specificity to the Notch receptors or the Notch ligands.

Humanized anti-Notch receptors or anti-Notch ligands antibodies and antibody fragments therefrom can also be prepared according to known techniques. "Humanized antibodies" are forms of non-human (e.g., rodent) chimeric antibodies that contain minimal sequence derived from non-human immunoglobulin. For the most part, humanized antibodies are human immunoglobulins (recipient antibody) in which residues from a hypervariable region (CDRs) of the recipient are replaced by residues from a hypervariable region of a non-human species (donor antibody) such as mouse, rat, rabbit or nonhuman primate having the desired specificity, affinity and capacity. In some instances, framework region (FR) residues of the human immunoglobulin are replaced by corresponding non-human residues. Furthermore, humanized antibodies may comprise residues that are not found in the recipient antibody or in the donor antibody. These modifications are made to further refine antibody performance. In general, the humanized antibody will comprise substantially all of at least one, and typically two, variable domains, in which all or substantially all of the hypervariable loops correspond to those of a non-human immunoglobulin and all or substantially all of the FRs are those of a human immunoglobulin sequence. The humanized antibody optionally also will comprise at least a portion of an immunoglobulin constant region (Fc), typically that of a human immunoglobulin. Methods for making humanized antibodies are described, for example, by Winter (U.S. Pat. No. 5,225,539) and Boss (Celltech, U.S. Pat. No. 4,816, 397).

Then, for this invention, neutralizing antibodies of Notch receptors or Notch ligands are selected.

In a particular embodiment, antibodies that bind to Notch ligands are well known (see for example Ridgway et al, 2006, Nature 444:1083-1087; Noguera-Troise et al,). Antibodies that bind to Notch receptors are also well know (see for example Li et al, 2008, J. Biol. Chem IEP Jan. 8, 2008). These antibodies can be used to inhibit Notch receptor activation. In addition, antibodies that bind to components of the gamma-secretase complex, e.g. nicastrin, can be used.

In particular, the antibodies against Notch receptors or ligand can be the mAb OMP-52M51 or the A5226A (see for example Bellavia D. et al 2018).

In another embodiment, the antibody according to the invention is a single domain antibody against Notch receptors or Notch ligands. The term "single domain antibody" (sdAb) or "VHH" refers to the single heavy chain variable domain of antibodies of the type that can be found in Camelid mammals which are naturally devoid of light chains. Such VHH are also called "Nanobody®". According to the invention, sdAb can particularly be llama sdAb. The term "VHH" refers to the single heavy chain having 3 complementarity determining regions (CDRs): CDR1, CDR2 and CDR3. The term "complementarity determining region" or "CDR" refers to the hypervariable amino acid sequences which define the binding affinity and specificity of the VHH.

The VHH according to the invention can readily be prepared by an ordinarily skilled artisan using routine experimentation. The VHH variants and modified form thereof may be produced under any known technique in the art such as in-vitro maturation.

VHHs or sdAbs are usually generated by PCR cloning of the V-domain repertoire from blood, lymph node, or spleen cDNA obtained from immunized animals into a phage display vector, such as pHEN2. Antigen-specific VHHs are commonly selected by panning phage libraries on immobilized antigen, e.g., antigen coated onto the plastic surface of a test tube, biotinylated antigens immobilized on streptavidin beads, or membrane proteins expressed on the surface of cells. However, such VHHs often show lower affinities for their antigen than VHHs derived from animals that have received several immunizations. The high affinity of VHHs from immune libraries is attributed to the natural selection of variant VHHs during clonal expansion of B-cells in the lymphoid organs of immunized animals. The affinity of VHHs from non-immune libraries can often be improved by mimicking this strategy in vitro, i.e., by site directed mutagenesis of the CDR regions and further rounds of panning on immobilized antigen under conditions of increased stringency (higher temperature, high or low salt concentration, high or low pH, and low antigen concentrations). VHHs derived from camelid are readily expressed in and purified from the *E. coli* periplasm at much higher levels than the corresponding domains of conventional antibodies. VHHs generally display high solubility and stability and can also be readily produced in yeast, plant, and mammalian cells. For example, the "Hamers patents" describe methods and techniques for generating VHH against any desired target (see for example U.S. Pat. Nos. 5,800,988; 5,874,541 and 6,015,695). The "Hamers patents" more particularly describe production of VHHs in bacterial hosts such as *E. coli* (see for example U.S. Pat. No. 6,765,087) and in lower eukaryotic hosts such as moulds (for example *Aspergillus* or *Trichoderma*) or in yeast (for example *Saccharomyces, Kluyveromyces, Hansenula* or *Pichia*) (see for example U.S. Pat. No. 6,838,254).

In one embodiment, the compound according to the invention is an aptamer. Aptamers are a class of molecule that represents an alternative to antibodies in term of molecular recognition. Aptamers are oligonucleotide or oligopeptide sequences with the capacity to recognize virtually any class of target molecules with high affinity and specificity. Such ligands may be isolated through Systematic Evolution of Ligands by EXponential enrichment (SELEX) of a random sequence library, as described in Tuerk C. and Gold L., 1990. The random sequence library is obtainable by combinatorial chemical synthesis of DNA. In this library, each member is a linear oligomer, eventually chemically modified, of a unique sequence. Possible modifications, uses and advantages of this class of molecules have been reviewed in Jayasena S. D., 1999. Peptide aptamers consists of a conformationally constrained antibody variable region displayed by a platform protein, such as *E. coli* Thioredoxin A that are selected from combinatorial libraries by two hybrid methods (Colas et al., 1996).

Then, for this invention, neutralizing aptamers of Notch receptors or Notch ligands are selected.

In one embodiment, the compound according to the invention is a polypeptide.

In a particular embodiment the polypeptide is an antagonist of Notch receptors or Notch ligands and is capable to prevent the function of Notch receptors or Notch ligands. Particularly, the polypeptide can be a mutated Notch receptors or Notch ligands or a similar protein without the function of Notch receptors or Notch ligands.

In one embodiment, the polypeptide of the invention may be linked to a cell-penetrating peptide" to allow the penetration of the polypeptide in the cell.

The term "cell-penetrating peptides" are well known in the art and refers to cell permeable sequence or membranous penetrating sequence such as penetratin, TAT mitochondrial penetrating sequence and compounds (Bechara and Sagan, 2013; Jones and Sayers, 2012; Khafagy el and Morishita, 2012; Malhi and Murthy, 2012).

The polypeptides of the invention may be produced by any suitable means, as will be apparent to those of skill in the art. In order to produce sufficient amounts of polypeptide or functional equivalents thereof for use in accordance with the present invention, expression may conveniently be achieved by culturing under appropriate conditions recombinant host cells containing the polypeptide of the invention. Preferably, the polypeptide is produced by recombinant means, by expression from an encoding nucleic acid molecule. Systems for cloning and expression of a polypeptide in a variety of different host cells are well known.

When expressed in recombinant form, the polypeptide is preferably generated by expression from an encoding nucleic acid in a host cell. Any host cell may be used, depending upon the individual requirements of a particular system. Suitable host cells include bacteria mammalian cells, plant cells, yeast and baculovirus systems. Mammalian cell lines available in the art for expression of a heterologous polypeptide include Chinese hamster ovary cells. HeLa cells, baby hamster kidney cells and many others. Bacteria are also preferred hosts for the production of recombinant protein, due to the ease with which bacteria may be manipulated and grown. A common, preferred bacterial host is *E coli*.

In specific embodiments, it is contemplated that polypeptides used in the therapeutic methods of the present invention may be modified in order to improve their therapeutic efficacy. Such modification of therapeutic compounds may be used to decrease toxicity, increase circulatory time, or modify biodistribution. For example, the toxicity of potentially important therapeutic compounds can be decreased significantly by combination with a variety of drug carrier vehicles that modify biodistribution. In example adding dipeptides can improve the penetration of a circulating agent in the eye through the blood retinal barrier by using endogenous transporters.

A strategy for improving drug viability is the utilization of water-soluble polymers. Various water-soluble polymers have been shown to modify biodistribution, improve the mode of cellular uptake, change the permeability through physiological barriers; and modify the rate of clearance from the body. To achieve either a targeting or sustained-release effect, water-soluble polymers have been synthesized that contain drug moieties as terminal groups, as part of the backbone, or as pendent groups on the polymer chain.

Polyethylene glycol (PEG) has been widely used as a drug carrier, given its high degree of biocompatibility and ease of modification. Attachment to various drugs, proteins, and liposomes has been shown to improve residence time and decrease toxicity. PEG can be coupled to active agents through the hydroxyl groups at the ends of the chain and via other chemical methods; however, PEG itself is limited to at most two active agents per molecule. In a different approach, copolymers of PEG and amino acids were explored as novel biomaterials which would retain the biocompatibility properties of PEG, but which would have the added advantage of numerous attachment points per molecule (providing greater drug loading), and which could be synthetically designed to suit a variety of applications.

Those of skill in the art are aware of PEGylation techniques for the effective modification of drugs. For example, drug delivery polymers that consist of alternating polymers of PEG and tri-functional monomers such as lysine have been used by VectraMed (Plainsboro, N.J.). The PEG chains (typically 2000 daltons or less) are linked to the a- and e-amino groups of lysine through stable urethane linkages. Such copolymers retain the desirable properties of PEG, while providing reactive pendent groups (the carboxylic acid groups of lysine) at strictly controlled and predetermined intervals along the polymer chain. The reactive pendent groups can be used for derivatization, cross-linking, or conjugation with other molecules. These polymers are useful in producing stable, long-circulating pro-drugs by varying the molecular weight of the polymer, the molecular weight of the PEG segments, and the cleavable linkage between the drug and the polymer. The molecular weight of the PEG segments affects the spacing of the drug/linking group complex and the amount of drug per molecular weight of conjugate (smaller PEG segments provides greater drug loading). In general, increasing the overall molecular weight of the block co-polymer conjugate will increase the circulatory half-life of the conjugate. Nevertheless, the conjugate must either be readily degradable or have a molecular weight below the threshold-limiting glomular filtration (e.g., less than 60 kDa).

In addition, to the polymer backbone being important in maintaining circulatory half-life, and biodistribution, linkers may be used to maintain the therapeutic agent in a pro-drug form until released from the backbone polymer by a specific trigger, typically enzyme activity in the targeted tissue. For example, this type of tissue activated drug delivery is particularly useful where delivery to a specific site of biodistribution is required and the therapeutic agent is released at or near the site of pathology. Linking group libraries for use in activated drug delivery are known to those of skill in the art and may be based on enzyme kinetics, prevalence of active enzyme, and cleavage specificity of the selected disease-specific enzymes. Such linkers may be used in modifying the protein or fragment of the protein described herein for therapeutic delivery.

Soluble receptor decoys that sequester Notch ligands can be used to inhibit Notch receptor activation (Funahashi et al, 2008, Cancer Res. 68:4727-4735). Also, soluble ligands that inhibit ligand binding to Notch receptors (Noguera-Troise et al, 2006, Nature 444:1032-1037) can be used.

In another embodiment, the Notch inhibitor according to the invention is an inhibitor of Notch receptors or Notch ligands gene expression.

Small inhibitory RNAs (siRNAs) can also function as inhibitors of Notch receptors or Notch ligands expression for use in the present invention. Notch receptors or Notch ligands gene expression can be reduced by contacting a subject or cell with a small double stranded RNA (dsRNA), or a vector or construct causing the production of a small double stranded RNA, such that Notch receptors or Notch ligands gene expression is specifically inhibited (i.e. RNA interference or RNAi). Methods for selecting an appropriate dsRNA or dsRNA-encoding vector are well known in the art for genes whose sequence is known (e.g. see for example Tuschl, T. et al. (1999); Elbashir, S. M. et al. (2001); Hannon, G J. (2002); McManus, M T. et al. (2002); Brummelkamp, T R. et al. (2002); U.S. Pat. Nos. 6,573,099 and 6,506,559; and International Patent Publication Nos. WO 01/36646, WO 99/32619, and WO 01/68836).

Ribozymes can also function as inhibitors of Notch receptors or Notch ligands gene expression for use in the present invention. Ribozymes are enzymatic RNA molecules capable of catalyzing the specific cleavage of RNA. The mechanism of ribozyme action involves sequence specific hybridization of the ribozyme molecule to complementary target RNA, followed by endonucleolytic cleavage. Engineered hairpin or hammerhead motif ribozyme molecules that specifically and efficiently catalyze endonucleolytic cleavage of Notch receptors or Notch ligands mRNA sequences are thereby useful within the scope of the present invention. Specific ribozyme cleavage sites within any potential RNA target are initially identified by scanning the target molecule for ribozyme cleavage sites, which typically include the following sequences, GUA, GUU, and GUC. Once identified, short RNA sequences of between about 15 and 20 ribonucleotides corresponding to the region of the target gene containing the cleavage site can be evaluated for predicted structural features, such as secondary structure, that can render the oligonucleotide sequence unsuitable. The suitability of candidate targets can also be evaluated by testing their accessibility to hybridization with complementary oligonucleotides, using, e.g., ribonuclease protection assays.

Both antisense oligonucleotides and ribozymes useful as inhibitors of Notch receptors or Notch ligands gene expression can be prepared by known methods. These include techniques for chemical synthesis such as, e.g., by solid phase phosphoramadite chemical synthesis. Alternatively, anti-sense RNA molecules can be generated by in vitro or in vivo transcription of DNA sequences encoding the RNA molecule. Such DNA sequences can be incorporated into a wide variety of vectors that incorporate suitable RNA polymerase promoters such as the T7 or SP6 polymerase promoters. Various modifications to the oligonucleotides of the invention can be introduced as a means of increasing intracellular stability and half-life. Possible modifications include but are not limited to the addition of flanking sequences of ribonucleotides or deoxyribonucleotides to the 5' and/or 3' ends of the molecule, or the use of phosphorothioate or 2'-O-methyl rather than phosphodiesterase linkages within the oligonucleotide backbone.

Antisense oligonucleotides siRNAs and ribozymes of the invention may be delivered in vivo alone or in association with a vector. In its broadest sense, a "vector" is any vehicle capable of facilitating the transfer of the antisense oligonucleotide siRNA or ribozyme nucleic acid to the cells and preferably cells expressing Notch receptors or Notch ligands. Preferably, the vector transports the nucleic acid to cells with reduced degradation relative to the extent of degradation that would result in the absence of the vector. In general, the vectors useful in the invention include, but are not limited to, plasmids, phagemids, viruses, other vehicles derived from viral or bacterial sources that have been manipulated by the insertion or incorporation of the antisense oligonucleotide siRNA or ribozyme nucleic acid sequences. Viral vectors are a preferred type of vector and include, but are not limited to nucleic acid sequences from the following viruses: retrovirus, such as moloney murine leukemia virus, harvey murine sarcoma virus, murine mammary tumor virus, and rouse sarcoma virus; adenovirus, adeno-associated virus; SV40-type viruses; polyoma viruses; Epstein-Barr viruses; papilloma viruses; herpes virus; vaccinia virus; polio virus; and RNA virus such as a retrovirus. One can readily employ other vectors not named but known to the art.

Preferred viral vectors are based on non-cytopathic eukaryotic viruses in which non-essential genes have been replaced with the gene of interest. Non-cytopathic viruses include retroviruses (e.g., lentivirus), the life cycle of which involves reverse transcription of genomic viral RNA into DNA with subsequent proviral integration into host cellular DNA. Retroviruses have been approved for human gene therapy trials. Most useful are those retroviruses that are replication-deficient (i.e., capable of directing synthesis of the desired proteins, but incapable of manufacturing an infectious particle). Such genetically altered retroviral expression vectors have general utility for the high-efficiency transduction of genes in vivo. Standard protocols for producing replication-deficient retroviruses (including the steps of incorporation of exogenous genetic material into a plasmid, transfection of a packaging cell lined with plasmid, production of recombinant retroviruses by the packaging cell line, collection of viral particles from tissue culture media, and infection of the target cells with viral particles) are provided in Kriegler, 1990 and in Murry, 1991).

Preferred viruses for certain applications are the adenoviruses and adeno-associated viruses, which are double-stranded DNA viruses that have already been approved for human use in gene therapy. The adeno-associated virus can be engineered to be replication deficient and is capable of infecting a wide range of cell types and species. It further has advantages such as, heat and lipid solvent stability; high transduction frequencies in cells of diverse lineages, including hemopoietic cells; and lack of superinfection inhibition thus allowing multiple series of transductions. Reportedly, the adeno-associated virus can integrate into human cellular DNA in a site-specific manner, thereby minimizing the possibility of insertional mutagenesis and variability of inserted gene expression characteristic of retroviral infection. In addition, wild-type adeno-associated virus infections have been followed in tissue culture for greater than 100 passages in the absence of selective pressure, implying that the adeno-associated virus genomic integration is a relatively stable event. The adeno-associated virus can also function in an extrachromosomal fashion.

Other vectors include plasmid vectors. Plasmid vectors have been extensively described in the art and are well known to those of skill in the art. See e.g. Sambrook et al., 1989. In the last few years, plasmid vectors have been used as DNA vaccines for delivering antigen-encoding genes to cells in vivo. They are particularly advantageous for this because they do not have the same safety concerns as with many of the viral vectors. These plasmids, however, having a promoter compatible with the host cell, can express a peptide from a gene operatively encoded within the plasmid. Some commonly used plasmids include pBR322, pUC18, pUC19, pRC/CMV, SV40, and pBlueScript. Other plasmids are well known to those of ordinary skill in the art. Additionally, plasmids may be custom designed using restriction enzymes and ligation reactions to remove and add specific fragments of DNA. Plasmids may be delivered by a variety of parenteral, mucosal and topical routes. For example, the DNA plasmid can be injected by intramuscular, eye, intradermal, subcutaneous, or other routes. It may also be administered by intranasal sprays or drops, rectal suppository and orally. It may also be administered into the epidermis or a mucosal surface using a gene-gun. The plasmids may be given in an aqueous solution, dried onto gold particles or in association with another DNA delivery system including but not limited to liposomes, dendrimers, cochleate and microencapsulation.

In a particular embodiment, the antisense oligonucleotide, siRNA, shRNA or ribozyme nucleic acid sequence is under the control of a heterologous regulatory region, e.g., a heterologous promoter. The promoter may be specific for Muller glial cells, microglia cells, endothelial cells, pericyte cells and astrocytes For example, a specific expression in Muller glial cells may be obtained through the promoter of the glutamine synthetase gene is suitable. The promoter can also be, e.g., a viral promoter, such as CMV promoter or any synthetic promoters.

In another embodiment, the invention relates to a method for treating a cancer comprising administering to a subject in need thereof a therapeutically effective amount of a tyrosine-kinase inhibitor (TKI) against epidermal growth factor receptor (EGFR) and an inhibitor of the Notch signalling pathway.

In a particular embodiment, the TKI is a TKI of third generation.

In order to test the functionality of a putative Notch inhibitor a test is necessary. For that purpose, to identify Notch inhibitor, it is needed to analyze the NOTCH1 processing by a g-secretase. Using this manner of inhibition or any other as antibodies against NOTCH receptors or ligands, would modulate several targets of the Notch pathway inducing a decrease in their expression including: HES1, HES5, HEY1 or HEY3. Another good marker of Notch inhibition is the induction of thymic stromal lymphopoietin (TSLP) in the serum.

Therapeutic Composition

Another object of the invention relates to a therapeutic composition comprising a a tyrosine-kinase inhibitor (TKI) against epidermal growth factor receptor (EGFR) and an inhibitor of the Notch signalling pathway for use in the treatment of cancer in a subject in need thereof.

In a particular embodiment, the TKI is a TKI of third generation.

Any therapeutic agent of the invention may be combined with pharmaceutically acceptable excipients, and optionally sustained-release matrices, such as biodegradable polymers, to form therapeutic compositions.

"Pharmaceutically" or "pharmaceutically acceptable" refers to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type.

The form of the pharmaceutical compositions, the route of administration, the dosage and the regimen naturally depend upon the condition to be treated, the severity of the illness, the age, weight, and sex of the patient, etc.

The pharmaceutical compositions of the invention can be formulated for a topical, oral, intranasal, parenteral, intraocular, intravenous, intramuscular or subcutaneous administration and the like.

Preferably, the pharmaceutical compositions contain vehicles which are pharmaceutically acceptable for a formulation capable of being injected. These may be in particular isotonic, sterile, saline solutions (monosodium or disodium phosphate, sodium, potassium, calcium or magnesium chloride and the like or mixtures of such salts), or dry, especially freeze-dried compositions which upon addition, depending on the case, of sterilized water or physiological saline, permit the constitution of injectable solutions.

The doses used for the administration can be adapted as a function of various parameters, and in particular as a function of the mode of administration used, of the relevant pathology, or alternatively of the desired duration of treatment.

In addition, other pharmaceutically acceptable forms include, e.g. tablets or other solids for oral administration; time release capsules; and any other form currently can be used.

Pharmaceutical compositions of the present invention may comprise a further therapeutic active agent. The present invention also relates to a kit comprising an agonist, antagonist or inhibitor of the expression according to the invention and a further therapeutic active agent.

For example, anti-cancer agents may be added to the pharmaceutical composition as described below.

Anti-cancer agents may be Melphalan, Vincristine (Oncovin), Cyclophosphamide (Cytoxan), Etoposide (VP-16), Doxorubicin (Adriamycin), Liposomal doxorubicin (Doxil) and Bendamustine (Treanda).

Others anti-cancer agents may be for example cytarabine, anthracyclines, fludarabine, gemcitabine, capecitabine, methotrexate, taxol, taxotere, mercaptopurine, thioguanine, hydroxyurea, cyclophosphamide, ifosfamide, nitrosoureas, platinum complexes such as cisplatin, carboplatin and oxaliplatin, mitomycin, dacarbazine, procarbizine, etoposide, teniposide, campathecins, bleomycin, doxorubicin, idarubicin, daunorubicin, dactinomycin, plicamycin, mitoxantrone, L-asparaginase, doxorubicin, epimbicm, 5-fluorouracil, taxanes such as docetaxel and paclitaxel, leucovorin, levamisole, irinotecan, estramustine, etoposide, nitrogen mustards, BCNU, nitrosoureas such as carmustme and lomustine, vinca alkaloids such as vinblastine, vincristine and vinorelbine, imatimb mesylate, hexamethyhnelamine, topotecan, kinase inhibitors, phosphatase inhibitors, ATPase inhibitors, tyrphostins, protease inhibitors, inhibitors herbimycm A, genistein, erbstatin, and lavendustin A. In one embodiment, additional anticancer agents may be selected from, but are not limited to, one or a combination of the following class of agents: alkylating agents, plant alkaloids, DNA topoisomerase inhibitors, anti-folates, pyrimidine analogs, purine analogs, DNA antimetabolites, taxanes, podophyllotoxin, hormonal therapies, retinoids, photosensitizers or photodynamic therapies, angiogenesis inhibitors, antimitotic agents, isoprenylation inhibitors, cell cycle inhibitors, actinomycins, bleomycins, MDR inhibitors and Ca2+ ATPase inhibitors.

Additional anti-cancer agents may be selected from, but are not limited to, cytokines, chemokines, growth factors, growth inhibitory factors, hormones, soluble receptors, decoy receptors, monoclonal or polyclonal antibodies, mono-specific, bi-specific or multi-specific antibodies, monobodies, polybodies.

Additional anti-cancer agent may be selected from, but are not limited to, growth or hematopoietic factors such as erythropoietin and thrombopoietin, and growth factor mimetics thereof.

In the present methods for treating cancer the further therapeutic active agent can be an antiemetic agent. Suitable antiemetic agents include, but are not limited to, metoclopromide, domperidone, prochlorperazine, promethazine, chlorpromazine, trimethobenzamide, ondansetron, granisetron, hydroxyzine, acetylleucine monoemanolamine, alizapride, azasetron, benzquinamide, bietanautine, bromopride, buclizine, clebopride, cyclizine, dunenhydrinate, diphenidol, dolasetron, meclizme, methallatal, metopimazine, nabilone, oxypemdyl, pipamazine, scopolamine, sulpiride, tetrahydrocannabinols, thiefhylperazine, thioproperazine and tropisetron. In a preferred embodiment, the antiemetic agent is granisetron or ondansetron.

In another embodiment, the further therapeutic active agent can be an hematopoietic colony stimulating factor. Suitable hematopoietic colony stimulating factors include, but are not limited to, filgrastim, sargramostim, molgramostim and epoietin alpha.

In still another embodiment, the other therapeutic active agent can be an opioid or non-opioid analgesic agent. Suitable opioid analgesic agents include, but are not limited to, morphine, heroin, hydromorphone, hydrocodone, oxymorphone, oxycodone, metopon, apomorphine, nomioiphine, etoipbine, buprenorphine, mepeddine, lopermide, anileddine, ethoheptazine, piminidine, betaprodine, diphenoxylate, fentanil, sufentanil, alfentanil, remifentanil, levorphanol, dextromethorphan, phenazodne, pemazocine, cyclazocine, methadone, isomethadone and propoxyphene. Suitable non-opioid analgesic agents include, but are not limited to, aspirin, celecoxib, rofecoxib, diclofinac, diflusinal, etodolac, fenoprofen, flurbiprofen, ibuprofen, ketoprofen, indomethacin, ketorolac, meclofenamate, mefanamic acid, nabumetone, naproxen, piroxicam and sulindac.

In yet another embodiment, the further therapeutic active agent can be an anxiolytic agent. Suitable anxiolytic agents include, but are not limited to, buspirone, and benzodiazepines such as diazepam, lorazepam, oxazapam, chlorazepate, clonazepam, chlordiazepoxide and alprazolam.

In yet another embodiment, the further therapeutic active agent can be a checkpoint blockade cancer immunotherapy agent.

Typically, the checkpoint blockade cancer immunotherapy agent is an agent which blocks an immunosuppressive receptor expressed by activated T lymphocytes, such as cytotoxic T lymphocyte-associated protein 4 (CTLA4) and programmed cell death 1 (PDCD1, best known as PD-1), or by NK cells, like various members of the killer cell immunoglobulin-like receptor (KIR) family, or an agent which blocks the principal ligands of these receptors, such as PD-1 ligand CD274 (best known as PD-L1 or B7-H1).

Typically, the checkpoint blockade cancer immunotherapy agent is an antibody.

In some embodiments, the checkpoint blockade cancer immunotherapy agent is an antibody selected from the group consisting of anti-CTLA4 antibodies, anti-PD1 antibodies, anti-PDL1 antibodies, anti-PDL2 antibodies, anti-TIM-3 antibodies, anti-LAG3 antibodies, anti-IDO1 antibodies, anti-TIGIT antibodies, anti-B7H3 antibodies, anti-B7H4 antibodies, anti-BTLA antibodies, and anti-B7H6 antibodies.

Prognostic Method

A second object of the present invention relates to a method for predicting the survival time of a subject suffering from lung cancer comprising the steps of: i) determining the expression level of HES1 in a biological sample obtained from the patient, ii) comparing the expression level determined at step i) with a predetermined reference value and iii) concluding that the patient will have a long survival time when the level determined at step i) is lower than the predetermined reference value or concluding that the patient will have a short survival time when the level determined at step i) is equal or higher than the predetermined reference value.

The term "biological sample" refers to any biological sample derived from the patient such as blood sample, plasma sample, serum sample or PDA sample.

As used herein, the term "HES1" for "hairy and enhancer of split-1" has its general meaning in the art and refers to a protein that is encoded by the Hes1 gene. HES1 is one of the seven members of the Hes gene family (HES1-7). HES genes code nuclear proteins that suppress transcription. This protein belongs to the basic helix-loop-helix (bHLH) family of transcription factors. It is a transcriptional repressor of genes that require a bHLH protein for their transcription. The protein has a particular type of basic domain that contains a helix interrupting protein that binds to the N-box promoter region rather than the canonical enhancer box (E-box). As a member of the bHLH family, it is a transcriptional repressor that influences cell proliferation and differentiation in embryogenesis. HES1 regulates its own expression via a negative feedback loop, and oscillates with approximately 2-hour periodicity.

The method of the present invention is particularly suitable for predicting the duration of the overall survival (OS), progression-free survival (PFS) and/or the disease-free survival (DFS) of the cancer patient. Those of skill in the art will recognize that OS survival time is generally based on and expressed as the percentage of people who survive a certain type of cancer for a specific amount of time. In general, OS rates do not specify whether cancer survivors are still undergoing treatment at five years or if they've become cancer-free (achieved remission). DFS gives more specific information and is the number of people with a particular cancer who achieve remission. Also, progression-free survival (PFS) rates (the number of people who still have cancer, but their disease does not progress) includes people who may have had some success with treatment, but the cancer has not disappeared completely. As used herein, the expression "short survival time" indicates that the patient will have a survival time that will be lower than the median (or mean) observed in the general population of patients suffering from said cancer. When the patient will have a short survival time, it is meant that the patient will have a "poor prognosis". Inversely, the expression "long survival time" indicates that the patient will have a survival time that will be higher than the median (or mean) observed in the general population of patients suffering from said cancer. When the patient will have a long survival time, it is meant that the patient will have a "good prognosis".

In some embodiment, the method of the invention in performed for predicting the overall survival (OS), progression-free survival (PFS) and/or the disease-free survival (DFS) of a patient suffering from lung cancer following lung resection.

In some embodiments, the present invention relates to a method for predicting the overall survival (OS) of a lung cancer patient comprising the steps of: i) determining the expression level of HES1 in a biological sample obtained from the patient, ii) comparing the expression level determined at step i) with a predetermined reference value and iii) concluding that the patient will have a long survival time when the level determined at step i) lower than the predetermined reference value or concluding that the patient will have a short survival time when the level determined at step i) is equal or higher than the predetermined reference value.

In some embodiments, the present invention relates to a method for predicting the progression free survival (PFS) of a lung cancer patient comprising the steps of: i) determining the expression level of HES1 in a biological sample obtained from the patient, ii) comparing the expression level determined at step i) with a predetermined reference value and iii) concluding that the patient will have a long progression free survival when the level determined at step i) is lower than the predetermined reference value or concluding that the patient will have a short progression free survival when the level determined at step i) is equal or higher than the predetermined reference value.

As used herein, the "reference value" refers to a threshold value or a cut-off value. The setting of a single "reference value" thus allows discrimination between a poor and a good prognosis with respect to the overall survival (OS) for a patient. Typically, a "threshold value" or "cut-off value" can be determined experimentally, empirically, or theoretically. A threshold value can also be arbitrarily selected based upon the existing experimental and/or clinical conditions, as would be recognized by a person of ordinary skilled in the art. The threshold value has to be determined in order to obtain the optimal sensitivity and specificity according to the function of the test and the benefit/risk balance (clinical consequences of false positive and false negative). Typically, the optimal sensitivity and specificity (and so the threshold value) can be determined using a Receiver Operating Characteristic (ROC) curve based on experimental data. Preferably, the person skilled in the art may compare the expression level (obtained according to the method of the invention) with a defined threshold value. In one embodiment of the present invention, the threshold value is derived from the expression level (or ratio, or score) determined in a biological sample derived from one or more patients having lung cancer. Furthermore, retrospective measurement of the expression level (or ratio, or scores) in properly banked historical patient samples may be used in establishing these threshold values.

Predetermined reference values used for comparison may comprise "cut-off" or "threshold" values that may be determined as described herein. Each reference ("cut-off") value for the biomarker of interest may be predetermined by carrying out a method comprising the steps of
  a) providing a collection of samples from patients suffering of lung cancer;
  b) determining the expression level of HES1 for each sample contained in the collection provided at step a);
  c) ranking the tumor tissue samples according to said expression level;
  d) classifying said samples in pairs of subsets of increasing, respectively decreasing, number of members ranked according to their expression level,
  e) providing, for each sample provided at step a), information relating to the responsiveness of the patient or the actual clinical outcome for the corresponding cancer patient (i.e. the duration of the progression-free survival (PFS) or the overall survival (OS) or both);
  f) for each pair of subsets of samples, obtaining a Kaplan Meier percentage of survival curve;
  g) for each pair of subsets of samples calculating the statistical significance (p value) between both subsets;
  h) selecting as reference value for the expression level, the value of expression level for which the p value is the smallest.

For example the expression level of a biomarker has been assessed for 100 PDA samples of 100 patients. The 100 samples are ranked according to their expression level. Sample 1 has the best expression level and sample 100 has the worst expression level. A first grouping provides two subsets: on one side sample Nr 1 and on the other side the 99 other samples. The next grouping provides on one side samples 1 and 2 and on the other side the 98 remaining samples etc., until the last grouping: on one side samples 1 to 99 and on the other side sample Nr 100. According to the information relating to the actual clinical outcome for the corresponding PDA patient, Kaplan Meier curves are prepared for each of the 99 groups of two subsets. Also for each of the 99 groups, the p value between both subsets was calculated.

The reference value is selected such as the discrimination based on the criterion of the minimum p value is the strongest. In other terms, the expression level corresponding to the boundary between both subsets for which the p value is minimum is considered as the reference value. It should be noted that the reference value is not necessarily the median value of expression levels.

In routine work, the reference value (cut-off value) may be used in the present method to discriminate PDA samples and therefore the corresponding patients.

Kaplan-Meier curves of percentage of survival as a function of time are commonly to measure the fraction of patients living for a certain amount of time after treatment and are well known by the man skilled in the art.

The man skilled in the art also understands that the same technique of assessment of the expression level of a biomarker should of course be used for obtaining the reference value and thereafter for assessment of the expression level of a biomarker of a patient subjected to the method of the invention.

Analyzing the HES1 expression level may be assessed by any of a wide variety of well-known methods for detecting expression of a transcribed nucleic acid or translated protein.

In one embodiment, the HES1 expression level is assessed by analyzing the expression of the protein translated from said gene. Said analysis can be assessed using an antibody (e.g., a radio-labeled, chromophore-labeled, fluorophore-labeled, or enzyme-labeled antibody), an antibody derivative (e.g., an antibody conjugate with a substrate or with the protein or ligand of a protein of a protein/ligand pair (e.g., biotin-streptavidin)), or an antibody fragment (e.g., a single-chain antibody, an isolated antibody hypervariable domain, etc.) which binds specifically to the protein translated from the gene encoding for the biomarker.

Methods for measuring the expression level of a biomarker in a sample may be assessed by any of a wide variety of well-known methods from one of skill in the art for detecting expression of a protein including, but not limited to, direct methods like mass spectrometry-based quantification methods, protein microarray methods, enzyme immunoassay (EIA), radioimmunoassay (RIA), Immunohistochemistry (IHC), Western blot analysis, ELISA, Luminex, ELISPOT and enzyme linked immunoabsorbant assay and undirect methods based on detecting expression of corresponding messenger ribonucleic acids (mRNAs). The mRNA expression profile may be determined by any technology known by a man skilled in the art. In particular, each mRNA expression level may be measured using any technology known by a man skilled in the art, including nucleic microarrays, quantitative Polymerase Chain Reaction (qPCR), next generation sequencing and hybridization with a labelled probe.

Said direct analysis can be assessed by contacting the sample with a binding partner capable of selectively interacting with the biomarker present in the sample. The binding partner may be an antibody that may be polyclonal or monoclonal, preferably monoclonal (e.g., a isotope-label, element-label, radio-labeled, chromophore-labeled, fluorophore-labeled, or enzyme-labeled antibody), an antibody derivative (e.g., an antibody conjugate with a substrate or with the protein or ligand of a protein of a protein/ligand pair (e.g., biotin-streptavidin)), or an antibody fragment (e.g., a single-chain antibody, an isolated antibody hypervariable domain, etc.) which binds specifically to the protein translated from the gene encoding for the biomarker of the invention. In another embodiment, the binding partner may be an aptamer.

The binding partners of the invention such as antibodies or aptamers, may be labelled with a detectable molecule or substance, such as an isotope, an element, a fluorescent molecule, a radioactive molecule or any others labels known in the art. Labels are known in the art that generally provide (either directly or indirectly) a signal.

As used herein, the term "labelled", with regard to the antibody, is intended to encompass direct labelling of the antibody or aptamer by coupling (i.e., physically linking) a detectable substance, such as an isotope, an element, a radioactive agent or a fluorophore (e.g. fluorescein isothiocyanate (FITC) or phycoerythrin (PE) or Indocyanine (Cy5)) to the antibody or aptamer, as well as indirect labelling of the probe or antibody by reactivity with a detectable substance. An antibody or aptamer of the invention may be produced with a specific isotope or a radioactive molecule by any method known in the art. For example radioactive molecules include but are not limited to radioactive atom for scintigraphic studies such as I123, I124, In111, Re186, Re188, specific isotopes include but are not limited to 13C, 15N, 126I, 79Br, 81Br.

The afore mentioned assays generally involve the binding of the binding partner (ie. antibody or aptamer) to a solid support. Solid supports which can be used in the practice of the invention include substrates such as nitrocellulose (e. g., in membrane or microtiter well form); polyvinylchloride (e. g., sheets or microtiter wells); polystyrene latex (e.g., beads or microtiter plates); polyvinylidene fluoride; diazotized paper; nylon membranes; activated beads, magnetically responsive beads, silicon wafers.

In a particular embodiment, an ELISA method can be used, wherein the wells of a microtiter plate are coated with a set of antibodies which recognize said biomarker. A sample containing or suspected of containing said biomarker is then added to the coated wells. After a period of incubation sufficient to allow the formation of antibody-antigen complexes, the plate(s) can be washed to remove unbound moieties and a detectably labelled secondary binding molecule added. The secondary binding molecule is allowed to react with any captured sample marker protein, the plate washed and the presence of the secondary binding molecule detected using methods well known in the art such as Singulex, Quanterix, MSD, Bioscale, Cytof.

In one embodiment, an Enzyme-linked immunospot (ELISpot) method may be used. Typically, the sample is transferred to a plate which has been coated with the desired anti-biomarker capture antibodies. Revelation is carried out with biotinylated secondary Abs and standard colorimetric or fluorimetric detection methods such as streptavidin-alkaline phosphatase and NBT-BCIP and the spots counted.

In one embodiment, when multi-biomarker expression measurement is required, use of beads bearing binding partners of interest may be preferred. In a particular embodiment, the bead may be a cytometric bead for use in flow cytometry. Such beads may for example correspond to BD™ Cytometric Beads commercialized by BD Biosciences (San Jose, California). Typically cytometric beads may be suitable for preparing a multiplexed bead assay. A multiplexed bead assay, such as, for example, the BD™ Cytometric Bead Array, is a series of spectrally discrete beads that can be used to capture and quantify soluble antigens. Typically, beads are labelled with one or more spectrally distinct fluorescent dyes, and detection is carried out using a multiplicity of photodetectors, one for each distinct dye to be detected. A number of methods of making and using sets of distinguishable beads have been described in the literature. These include beads distinguishable by size, wherein each size bead is coated with a different target-specific antibody (see e.g. Fulwyler and McHugh, 1990, Methods in Cell Biology 33:613-629), beads with two or more fluorescent dyes at varying concentrations, wherein the beads are identified by the levels of fluorescence dyes (see e.g. European Patent No. 0 126,450), and beads distinguishably labelled with two different dyes, wherein the beads are identified by separately measuring the fluorescence intensity of each of the dyes (see e.g. U.S. Pat. Nos. 4,499,052 and 4,717,655). Both one-dimensional and two-dimensional arrays for the simultaneous analysis of multiple antigens by flow cytometry are available commercially. Examples of one-dimensional arrays of singly dyed beads distinguishable by the level of fluorescence intensity include the BD™ Cytometric Bead Array (CBA) (BD Biosciences, San Jose, Calif.) and CytoPlex™ Flow Cytometry microspheres (Duke Scientific, Palo Alto, Calif.). An example of a two-dimensional array of beads distinguishable by a combination of fluorescence intensity (five levels) and size (two sizes) is the QuantumPlex™ microspheres (Bangs Laboratories, Fisher, Ind.). An example of a two-dimensional array of doubly-dyed beads distinguishable by the levels of fluorescence of each of the two dyes is described in Fulton et al. (1997, Clinical Chemistry 43(9):1749-1756). The beads may be labelled with any fluorescent compound known in the art such as e.g. FITC (FL1), PE (FL2), fluorophores for use in the blue laser (e.g. PerCP, PE-Cy7, PE-Cy5, FL3 and APC or Cy5, FL4), fluorophores for use in the red, violet or UV laser (e.g. Pacific blue, pacific orange). In another particular embodiment, bead is a magnetic bead for use in magnetic separation. Magnetic beads are known to those of skill in the art. Typically, the magnetic bead is preferably made of a magnetic material selected from the group consisting of metals (e.g. ferrum, cobalt and nickel), an alloy thereof and an oxide thereof. In another particular embodiment, bead is bead that is dyed and magnetized.

In one embodiment, protein microarray methods may be used. Typically, at least one antibody or aptamer directed against the biomarker is immobilized or grafted to an array(s), a solid or semi-solid surface(s). A sample containing or suspected of containing the biomarker is then labelled with at least one isotope or one element or one fluorophore or one colorimetric tag that are not naturally contained in the tested sample. After a period of incubation of said sample with the array sufficient to allow the formation of antibody-antigen complexes, the array is then washed and dried. After all, quantifying said biomarker may be achieved using any appropriate microarray scanner like fluorescence scanner, colorimetric scanner, SIMS (secondary ions mass spectrometry) scanner, maldi scanner, electromagnetic scanner or any technique allowing to quantify said labels.

In another embodiment, the antibody or aptamer grafted on the array is labelled.

In another embodiment, reverse phase arrays may be used. Typically, at least one sample is immobilized or grafted to an array(s), a solid or semi-solid surface(s). An antibody or aptamer against the suspected biomarker is then labelled with at least one isotope or one element or one fluorophore or one colorimetric tag that are not naturally contained in the tested sample. After a period of incubation of said antibody or aptamer with the array sufficient to allow the formation of antibody-antigen complexes, the array is then washed and dried. After all, detecting quantifying and counting by D-SIMS said biomarker containing said isotope or group of isotopes, and a reference natural element, and then calculating the isotopic ratio between the biomarker and the reference natural element. may be achieve using any appropriate microarray scanner like fluorescence scanner, colorimetric scanner, SIMS (secondary ions mass spectrometry) scanner, maldi scanner, electromagnetic scanner or any technique allowing to quantify said labels.

In one embodiment, said direct analysis can also be assessed by mass Spectrometry. Mass spectrometry-based quantification methods may be performed using either labelled or unlabelled approaches (DeSouza and Siu, 2012). Mass spectrometry-based quantification methods may be performed using chemical labeling, metabolic labeling or proteolytic labeling. Mass spectrometry-based quantification methods may be performed using mass spectrometry label free quantification, LTQ Orbitrap Velos, LTQ-MS/MS, a quantification based on extracted ion chromatogram EIC (progenesis LC-MS, Liquid chromatography-mass spectrometry) and then profile alignment to determine differential expression of the biomarker.

In another embodiment, the biomarker expression level is assessed by analyzing the expression of mRNA transcript or mRNA precursors, such as nascent RNA, of biomarker gene. Said analysis can be assessed by preparing mRNA/cDNA from cells in a sample from a patient, and hybridizing the mRNA/cDNA with a reference polynucleotide. The prepared mRNA/cDNA can be used in hybridization or amplification assays that include, but are not limited to, Southern or Northern analyses, polymerase chain reaction analyses, such as quantitative PCR (TaqMan), and probes arrays such as GeneChip™ DNA Arrays (AFFYMETRIX).

Advantageously, the analysis of the expression level of mRNA transcribed from the gene encoding for biomarkers involves the process of nucleic acid amplification, e. g., by RT-PCR (the experimental embodiment set forth in U.S. Pat. No. 4,683,202), ligase chain reaction (Barany, 1991), self sustained sequence replication (Guatelli et al., 1990), transcriptional amplification system (Kwoh et al., 1989), Q-Beta Replicase (Lizardi et al., 1988), rolling circle replication (U.S. Pat. No. 5,854,033) or any other nucleic acid amplification method, followed by the detection of the amplified molecules using techniques well known to those of skill in the art. These detection schemes are especially useful for the detection of nucleic acid molecules if such molecules are present in very low numbers. As used herein, amplification primers are defined as being a pair of nucleic acid molecules that can anneal to 5' or 3' regions of a gene (plus and minus strands, respectively, or vice-versa) and contain a short region in between. In general, amplification primers are from about 10 to 30 nucleotides in length and flank a region from about 50 to 200 nucleotides in length. Under appropriate conditions and with appropriate reagents, such primers permit the amplification of a nucleic acid molecule comprising the nucleotide sequence flanked by the primers.

In a particular embodiment, the invention relates to the combination of tyrosine-kinase inhibitor (TKI) of third generation against epidermal growth factor receptor (EGFR) and an inhibitor of the Notch signalling pathway for use in the treatment of a cancer in a subject with a high expression level of HES1.

In other word, the invention relates to the combination of tyrosine-kinase inhibitor (TKI) against epidermal growth factor receptor (EGFR) and an inhibitor of the Notch signalling pathway for use in the treatment of a cancer in a subject with a short survival time according to the invention.

In a particular embodiment, the TKI is a TKI of third generation.

In a particular embodiment, the invention also relates to an inhibitor of HES1 for use in the treatment of a cancer in a subject in need thereof.

As used herein, the term "inhibitor of HES1" denotes all molecules which inhibits the activity and the expression of the protein HES1 and notably its function of transcriptional repressor of genes that require a bHLH protein for their transcription.

Inhibitor of HES1 are well known in the art (see for example Li Yiwei et al 2012).

According to the invention, the HES1 inhibitor can be a small molecule, an antibody, a VHH or an inhibitor of the gene expression (like siRNA, shRNA) as described below.

In a particular embodiment, the inhibitor of the HES1 is a siRNA.

In a particular embodiment, the HES1 inhibitor can be used with an EGFR TKI of first (like erlotinib), second (like gefitinib or afatinib) or third generation (like osimertinib) and others anti-cancer agents (see below).

The invention will be further illustrated by the following figures and examples. However, these examples and figures should not be interpreted in any way as limiting the scope of the present invention.

FIGURES

FIG. 1. Effect of the combination of Osimertinib and Notch pathway inhibition in osimertinib resistant cells (A) PC9GROR cells were treated with either vehicle (DMSO), DBZ (250 nM), osimertinib (25 nM), or the combination of DBZ and osimertinib during 10 days (n=3 wells for each condition). The proliferation was determined by SRB staining at the indicated time points. The X-axis shows the cellular growth fold increase versus day 0 in each treatment and time point. (B) 3.5×106 PC9GROR cells were injected subcutaneously in the right flank of nude mice. Mice were treated with vehicle (methocel, n=8), DBZ (n=8), osimertinib (n=8), or the combination of DBZ/osimertinib (n=7). The tumors size was measured twice a week. The X-axis shows the tumor growth fold increase versus day 0 in each treatment and time point.

The values correspond to the average ±SEM. Statistical significance was determined by unpaired two-tailed Student's t test: * p≤0.05,  p≤0.01, * p≤0.001 and **** p≤0.0001.

FIG. 2. Role of the Notch pathway in EGFR mutated LUAD patients (A) PDX coming from a lung adenocarcinoma EGFRT790M/L858R was implanted in the right flank of nude mice. When the tumor was around 100 mm3, the mice were treated with vehicle (methocel, n=5), DBZ (n=5), gefitinib (n=4) or combination DBZ/gefitinib (n=5). Tumor size was measured twice a week with a caliper. The X-axis shows the tumor growth fold increase versus day 0 in each treatment and time point. The values correspond to the average ±SEM. Statistical significance was determined by unpaired two-tailed Student's t test:  p≤0.01 and ** p≤0.0001. (B) Progression-free survival of erlotinib-treated patients with EGFR-mutated lung tumors (n=40), according to HES1 expression assessed by IHC staining (low-HES1=0 to 2.5 HES1 score, and high-HES1=2.51 to 5 HES1 score). Statistical significance was determined by Gehan-Breslow-Wilcoxon test.

FIG. 3: In vitro evaluation of the synergism of gefitinib and nirogacestat combinations The interaction of gefitinib and nirogacestat was evaluated using a full-range dose matrix approach and SRB cytotoxicity tests for two-drug combinations in two molecularly characterized human lung adenocarcinoma cell lines harboring the gefitinib resistant mutation $EGFR^{T790M}$, H1975 (A) and PC9GR (B). Results are presented as values of the synergistic and antagonistic effects with positive and negative values respectively FIG. 4: In vivo treatment of gefitinib and nirogacestat combinations PC9GR cells were grafted subcutaneously in nude mice, and treated two weeks later with 50 mg/kg/day of nirogacestat or 10 mg/kg/day of gefitinib alone, or with a combination of both drugs during 2 weeks, 2 days a week.

EXAMPLES

Material & Methods

Mice

Tet-on-$EGFR^{T790M/L858R}$; CCSP-rtTA and the $Kras^{G12D/+}$; $Stat3^{f/f}$ mice were already described (11,12,29).

The induction of the tumors in EGFR model was done by administration of Doxycyline pellets in the diet (A03 at 1 g/Kg Doxycycline Hyclate, Safe, France) in mice during 8 weeks and maintained all time during the treatments with the different drugs.

In the $Kras^{G12D/+}$ mice, the induction was done by intratracheal delivery of adeno-cre into the mice to induce the expression of the oncogene with concomitant excision of STAT3 specifically in the lung. The experiment was done 13 weeks after the loxP excision.

AthymicNude-Foxn1 mice (females, 6-weeks old) were purchased from Envigo (France). 3.5×10⁶ PC9, PC9GR or PC9GROR cells were injected subcutaneously in the flank of the mice. 2 weeks after injection, the treatments were started and the tumor growth was monitored twice a week with a caliper.

Animal procedures were performed according to protocols approved by the French national committee of animal care.

Western Blot

Proteins analysis was done as previously described (7). Briefly, Cell extracts were prepared by incubation of cells on ice for 30 min in 50 mM Tris-HCl buffer (pH8), supplemented with 150 mM NaCl, 5 mM EDTA, 0.5% DOCNa, 1% SDS, 1% Triton X100, cocktail inhibitor of phosphatases and of proteases (Sigma, USA, #P5726 and #P8340). The cellular debris was removed by centrifugation at 15.000 rpm for 10' at 4° c. Protein concentration was measured using Pierce™ BCA Protein Assay Kit (ThermoFisher Scientific, USA).

The following antibodies were used for the analysis: N1ICD #4147, Cell Signaling Technology, USA, 1:500 dilution), HES1 (#11988, Cell Signaling Technology, USA, 1:1000 dilution), NOTCH1 (#3608, Cell Signaling Technology, USA, 1:1.000 dilution), NOTCH2 (#5732, Cell Signaling Technology, USA, 1:1000 dilution), NOTCH3 (#5276, Cell Signaling Technology, USA, 1:1.000 dilution), p-STAT3 (#9145, Cell Signaling Technology, USA, 1:1000 dilution), total STAT3 (#610189, BD, USA, 1:1000 dilution), Tubulin (#T9026, Sigma, USA, 1:2000 dilution).

Secondary antibodies were either horseradish peroxidase-linked anti-rabbit (#7077, Cell Signaling Technology, USA, 1:10000 dilution), or anti-mouse (#7076, Cell Signaling Technology, USA, 1:10000 dilution). Detection was performed by chemiluminescence using the ECL detection system (GE Healthcare) or ECL Plus (for N11CD) (GE Healthcare).

Drugs Treatments in Mice.

The dibenzazepine DBZ ((S)-2-(2-(3,5-Difluorophenyl)acetamido)-N—((S)-5-methyl-6-oxo-6,7-dihydro-5H-dibenzo[b,d]azepin-7-yl)propanamide) was obtained from Syncom (#SIC-020042, Netherland) and was administered 4 days a week (from Monday to Thursday) early in the morning at 3.3 mg/kg/day by intraperitoneal (IP) injection. Gefitinib (Cliniscience, France) was given by gavage early in the morning 4 days a week (from Monday to Thursday) at 20 mg/kg/day. Osimertinib (Cliniscience, France) was given by gavage early in the morning 5 days a week (from Monday to Friday) by gavage at 5 mg/kg/day. Antibodies diluted in PBS against NOTCH1 (NRR1) and NOTCH3 (NRR3) were administered by IP injection. NRR1 at 5 mg/kg/day every 5 days and NRR3 at 15 mg/kg/day every Monday and Thursday respectively, in both cases during 5 weeks. Mice were scarified 4 h after the last treatment and samples were obtained for immunohistochemical and western blot analysis.

Histopathology and Immunohistochemistry.

For routine histological analysis, lung lobes were fixed in 10% buffered formalin (Sigma, USA), embedded in paraffin. Consecutive 3 µm-thick sections were cut and stained with hematoxylin and eosin (H&E) or used for IHC. For quantification of tumors in the H&E, the five lobes of the lungs (4 right and 1 left) were placed in a similar plane and a single section across all the lobes was examined by H&E. Tumoural- and total lung area were measured using Image J software of the whole slide scan. For pathological analysis of H&E, classical citoarchitectural histological features such as invasion or high mitotic rate were applied by the expert pathologist M. C., to identify and quantify the adenocarcinomas. Most of them were solid, with areas of glandular differentiation (like cytoplasmic mucin or formation of papillae). For immunohistochemistry, the following antibodies were used: rabbit monoclonal to HES1 (1:1000 dilution, 11988 from Cell Signaling Technology, USA); rat monoclonal to Ki67 (1:100 dilution, TEC-3 from DAKO); rabbit polyclonal to phospho-p44/42 Erk1/Erk2 (Thr202/Tyr204 and Thr185/Tyr187, respectively) (1:25 dilution, 9101 from Cell Signaling Technology, USA); rabbit monoclonal to phospho-STAT3 (Tyr705) (1:150 dilution, clone EP2109Y from Novus Biologicals, USA); and rabbit monoclonal to phospho-Akt1 (Ser473) (1:175 dilution, clone EP2109Y from Novus Biologicals, USA). For each tumor, five high-magnification fields were scored. We scored on average 1500 cells per tumor in two categories: positive or negative also using Image J software. For the intensity, a score (between 0 and 5) was done to each IHC.

Cell Culture and Transfection Reagents.

The gefitinib sensitive human adenocarcinoma NSCLC cell line PC9 and the cells resistant to gefitinib, PC9GR and to osimertinib, PC9GROR were obtained from the lab of Y.Y. (21). They were cultured in RPMI1640-10% FCS in humidified 5% $CO_2$ at 37° C.

The siRNA control (non-targeting, siNT), against HES1 (siHES1) or against STAT3 (siSTAT3) were purchased from Dharmacon (USA) and transfected in cells at 20 nM with the Dharmafect1 following supplier's instruction.

For proliferation and Foci assays the cells were pre-treated 72 h with 250 nM of DBZ (same stock than for in vivo experiments explained above) before being plated and the DBZ was been maintained during all the experiment. The gefitinib and the osimertinib were added to cell media 8 h after plating at 15 nM and 25 nM respectively (Cliniscience, France).

For WB, RNAseq or ChIP the cells has been treated 72 h with DBZ (250 nM) then serum starved overnight and treated with gefitinib or osimertinib for 6 h before the end of the experiment (at 1 µM or 250 nM respectively).

Proliferation Assay 1500 cells were plated in 96 wells in RPMI1640, 2% FCS after 72 h of pretreatment with Vehicle or DBZ, 8 h after plating the different drugs were added as described above. For siRNA experiment, 2500 cells were plated in 96 wells and the day after the cells were transfected. 6 h after transfection the medium was changed for 2% FCS and the drugs were added. Then the plates were fixed at different time points in trichloroacetic acid 10% (Sigma, USA) 30' and stocked at 4° c. in PBS. Twice a week the mediums and drugs were replaced. After the fixation of the last plate, the cells were stained with SRB diluted in acetic acid 1% (Sigma, USA) during 30' and the SRB was dissolved in Tris 10 mM (pH10.5) for 10'. The absorbance was then read at 540 nm and data was represented as fold induction versus day 0.

Foci Assay 200 cells were plated in 6 wells in RPMI1640, 2% FCS after 72 h of pretreatment with vehicle or DBZ, 8 h after plating the different drugs were added as described above. The medium and drugs were replaced twice a week during 3 weeks and the cells were fixed with trichloroacetic 10% (Sigma) and stained with SRB (Sigma, USA).

RNA Sequencing

Cells were treated as described above and then they were washed and RNA extracted with RNeasy kit (Qiagen, Germany). The RNA integrity was checked with an agilent chip and 1 µg of RNA per condition (3 replicates for each treatment) was sent to Fasteris (Switzerland) for the RNA sequencing. 50 bp Illumina short reads were first examined with FastQC tool, which revealed common compositional bias over the first 15 bps. We removed these first 15 bps with an in-house Perl script before to submit to STAR genome aligner (2 passes) with default parameters. Reads were aligned against Ensembl *Homo sapiens* genome assembly (GRCh38). Read counts were extracted from STAR output file with HTSeq and only the protein coding genome features were taken into account in the final count matrix.

Sample count normalization was realized by summing read counts for each sample ($s_i$, i=1, . . . , 12), computing a first factor for each sample $f_i = s_i / \text{median}_{j, \ldots, 12}(s_j)$. These factors were normalized such that the product of all the normalized factors g, is equal to 1:

$$g_i = \frac{f_i}{\sqrt[1/12]{\prod_{j=1,\ldots,12} f_j}}.$$

Finally, each column (each sample) of the read count matrix was divided the corresponding $g_i$.

Classical multiclass differential expression analysis comparing the different experimental conditions (treatments) using EdgeR or Voom R libraries revealed many regulated genes but failed to uncover synergistic effects between DBZ and gefitinib. That is, genes regulated in the combined treatment compared to the control condition were always found in control versus DBZ or control versus gefitinib with a similar fold change. The expected regulation of many differential genes confirmed the quality of our data but it did not provide candidate genes explaining the observed synergistic action of the two compounds. We thus reasoned that data should be interrogated differently, looking for a global synergy pattern. Namely, we searched for genes that did not change their expression upon DBZ or gefitinib treatments but featured a clear change upon the combined treatment. We required fold-change <1.5 in the independent treatment and >3 fold decrease in the combined treatment. Moreover, reproducibility among replicates was enforced imposing a coefficient of variation (CV)<0.5 within each condition and reliable gene detection by imposing an average read count >300 over all the samples. These conditions selected 3 genes only, see FIG. 3c. To assess statistical significance of this finding, we performed identical selection on randomly permutated data 10000 times. A P-value of 0.27% was estimated (percentage of random selections returning 3 or more genes).

Chromatine Immunoprecipitation

After drugs treatment (see above), the cells were arrested and the chromatin preparation was performed as described previously (35). We used ChIP Adem-kit and ChIP DNA prep kit (Ademtech, France) for chromatin IP and DNA purification on an automag robot according the manufacturer's instructions. For NOTCH1 IP we have used the antibody from Abcam (#ab27525) and for phospho-STAT3 from Cell Signaling Technology (#9145).

The immunoprecipitated DNA was analyzed by PCR for the presence of fragments corresponding to a region close to the transcriptional start site of the human HES1 genes using selected primers.

Patient Derived Xenograft Model.

Patient-derived xenograft (PDX) was generated in the laboratory of L.P.-A. in the Instituto de Biomedicina de Sevilla (IBIS). Among the LUAD PDX collection they have developed we selected one depending on EGFR mutation status. Particularly, it was a naïve treated patient subjected to surgery. The tumor did have a TNM of T2a N1 M0. Regarding the EGFR mutations they were: p.Leu858Arg & p.Thr790Met. Tumor was transported in RPMI media at 4° C. into the animal facility at IBIS and subcutaneously implanted in both flanks of nude mice to be amplified. After 3 passages, the model was considered as established and a piece of 0.5 mm3 was implanted in the right flank of each mouse and let growth 2 weeks before randomization and the start of treatments. The tumor growth was monitored twice a week with a caliper.

Patients and Ethical Considerations

Patients harboring EGFR-activating mutations (either exon 19 deletion or exon 21 mutation) who had been treated with EGFR-TKI were selected. 40 patients coming from Toulouse University Hospital (36), and 4 who had participated in the MOSCATO (NCT01566019) or MATCH-R (NCT02517892) clinical trials from Institut Gustave Roussy. All patients had signed an informed consent permitting analyses of tissues. All informed consents were collected and stored in the pathology department of each institution. This study was approved by the person protection committee of each institution and the medicine french agency (ANSM). The samples were reanalyzed for HES1 expression by IHC.

Statistical Analysis

Unless otherwise specified, data are presented as mean±S.E.M. For the analysis of HES1 and PFS in patient samples, we analyzed the results with a Gehan-Breslow-Wilcoxon test. Sample sizes for comparisons between groups followed Mead's recommendations. In particular, we calculate the degrees of freedom of the error component (E) by compiling the total number of samples analyzed (N) for a given comparison minus the number of groups or treatments (T) (cell type, genotypes, etc) and as recommended it was between 10 and 20 or sometimes higher. For the experiments with mice we only analyzed those animals that do not die in cage by tumors but where sacrifyzed following human-end point criteria. There was no exclusion for any other type of sample. Samples (cells or mice) were allocated to their experimental groups according to their pre-determined type (cell type or mouse treatment). Investigators were not blinded to the experimental groups but for the analysis of: FIG. 1b, 1c, 2a, 2b and 2c.

* $p<0.05$;  $p<0.01$; * $p<0.001$; **** $p<0.0001$.

Results

Pharmacological Inhibition of the Notch Pathway Hampers Tumor Development in EGFR$^{T790M/L858R}$ Mice The Notch pathway is hyperactive in Kras$^{G12V}$-driven LUAD (7). In order to address whether this could also be the case in EGFR-driven LUAD, we used the GEMM EGFR$^{T790M/L858R}$ (11), that after crossed with the lung specific CCSP-rtTA transgenic mice (12), develop bronchial and peripheral EGFR$^{T790M/L858R}$-driven LUAD with acquired resistance to first generation EGFR TKIs upon doxycycline treatment (11). Therefore, we have started analyzing the expression of the processed and active form of NOTCH1, N1ICD, and the read-out of the Notch pathway, HES1, in this setting. Interestingly, both proteins were highly expressed in EGFR$^{T790M/L858R}$-driven LUAD when compared to normal lung from littermates of the tumor bearing EGFR$^{T790M/L858R}$ mice, either EGFR$^{T790M/L858R}$ mice non-treated with doxycycline or CCSP-rtTA single transgenic mice treated with same regime of doxycycline (data not shown). This is consistent with our previously reported data in the Kras$^{G12V}$-driven LUAD (7), suggesting that the Notch pathway could play a similar role in LUAD developed by both genetic insults.

The fact that both NOTCH1 and NOTCH3 receptors play a major role in Kras$^{G12V}$-driven LUAD while NOTCH2 showed a tumor suppressive role in this context (13-15) prompted us to analyze the expression of all these proteins in EGFR$^{T790M/L858R}$-driven LUAD. Levels of transmembrane NOTCH1 (i.e. before γ-secretase cleavage) were higher in LUAD compared to normal lung that correlated with N1ICD levels (data not shown). Interestingly, while levels of transmembrane NOTCH2 were not different between both conditions, transmembrane NOTCH3 levels were highly upregulated in LUAD compared to normal lung (data not shown).

Taken together, our data suggest that similarly to KRAS, oncogenic EGFR leads to higher activity of both NOTCH1 and NOTCH3.

To test whether the increased activity of the Notch pathway in oncogenic EGFR lung expressing cells is needed for tumoral cells, the expression of EGFR$^{T790M/L858R}$ was induced in a subset of mice and after 8 weeks of doxycycline treatment mice were randomly separated into three groups: control group, treated with vehicle and IgG antibody control; GSI group, treated with dibenzazepine (DBZ), a potent and selective GSI; or NRR1/NRR3 group, treated with blocking antibodies against NOTCH1 and NOTCH3, following our previously reported treatment regime (16,17) and (Siebel et al, unpublished).

After five weeks of treatment the control group presented more than 40% of tumoral area in the lungs (data not shown). Importantly, mice treated with NRR1 and NRR3 antibodies or with DBZ showed around 10% and 20% of tumoral area respectively, indicating that, similarly to KRAS-driven LUAD (7), the Notch pathway is necessary for EGFR$^{T790M/L858R}$-driven tumors (data not shown).

Importantly, we did not detect changes in the weight of animals among the different groups, suggesting the absence of undesired side effects (data not shown). This contrasts with previous reports on Notch inhibition that showed severe loss of weight when using stronger regimes than those performed in here (18).

Analysis of protein expression by IHC of tumors from mice treated with NRR1-NRR3 antibodies or DBZ showed less HES1 positive cells, when compared to the control group, as expected (data not shown). Notch inhibited tumors showed also a decreased staining in Ki67 positive cells compared to the vehicle treated one, indicating that Notch activity is required for proliferation (data not shown).

To gain insight into the antitumoral effect of Notch inhibition, we also measured in the same samples the crucial activities for EGFR-driven tumors, MAPK and AKT (19), performing an analysis using pERK and pAKT antibodies. Interestingly, we found a decrease in the number of positive cells for pERK in both treatments (data not shown), consistent with our previous work in KRAS-driven LUAD treated with GSI (7). In contrast, we could not find a significant decrease in the number of pAKT positive cells when compared to controls (data not shown).

Overall, these results demonstrate that the Notch pathway is hyperactive in EGFR$^{T790M/L858R}$-driven tumors, which are addicted to Notch activity.

Pharmacological Inhibition of γ-Secretase Re-Sensitizes EGFR$^{T790M/L858R}$-Driven Tumors to Gefitinib Next, we wondered if pharmacological inhibition of the Notch pathway could have any impact in the resistance to gefitinib conferred by the gatekeeper mutation EGFR$^{T790M}$ i vivo. For simplicity, but also because GSIs are in clinical trials for different types of cancer including LUAD (20), we decided to use only DBZ to inhibit the Notch pathway hereafter. Previous reports using cell lines and subcutaneous xenografts have shown that combined treatment with Notch inhibitors and EGFR TKIs resulted in better responses than any of the treatments alone in human cells sensitive to EGFR TKIs (8-10). In contrast, the role of the Notch pathway in already acquired TKI relapse promoted by gatekeeper mutations is unknown.

In order to study this, the expression of EGFR$^{T790M/L858R}$ was induced in a subset of mice and after 8 weeks of doxycycline treatment mice were randomly separated into four groups: control group, treated with vehicle; GSI group, treated with dibenzazepine (DBZ/GEF); gefitinib group; and treated with a combination of DBZ and gefitinib (DBZ). Similar to before, we could not detect changes in the weight of animals among the different groups after the five weeks of treatment, suggesting the absence of undesired side effects (data not shown).

We analyzed the tumoral area in all mice and, consistently with our previous results (data not shown), the control group presented 42% of tumoral area while animals treated with DBZ alone showed a tumoral area of 23% (data not shown). As expected, gefitinib did not have any therapeutic benefit in EGFR$^{T790M/L858R}$ mice when compared to the control mice, and displayed a tumoral area of 52%. Importantly, the combination of DBZ and gefitinib led to a very significant reduction of the tumoral area (i.e. 10%), hence, less than half than the DBZ treatment alone; five times less than gefitinib alone; and four times less than vehicle group (data not shown).

To further dissect this phenotype, a histopathological analysis was performed on EGFR$^{T790M/L858R}$ treated lungs and we concentrated on the clinically relevant LUAD (data not shown). Single treatments, either GSI or gefitinib groups, did not affect the amount of LUADs compared to controls (data not shown). Interestingly, DBZ/GEF treated mice had significantly less LUADs than controls or single treatment with gefitinib, decreasing from 31 to 10 on average per mouse (data not shown).

Of note, from analysis of all mice by IHC, we found that gefitinib treatment did not impact on the staining of any proteins when compared to the vehicle treated ones (data not shown). By contrast, GSI treated mice showed a decrease in the percentage of HES1 positive cells. In particular, when compared to controls, we found a decrease of 50% and of 61%, for DBZ- and DBZ/GEF-treated mice, respectively (data not shown). Analysis of Ki67 staining of DBZ- and DBZ/GEF-treated mice showed a decrease to 45% and 59% respectively the percentage of Ki67 positive cells when compared to vehicle treated tumors (data not shown). Consistently, the percentage of pERK positive cells decreased to 40% in DBZ alone and to 65% upon the dual treatment DBZ and gefitinib when compared to controls (data not shown). Similar to before, GSI treatment did not change the number of cells expressing pAKT, and neither changed against gefitinib. Interestingly in DBZ/GEF treated mice there was a significant decrease of 49% in the percentage of pAKT positive cells compared to gefitinib treated mice and a decrease of 55% versus vehicle that was almost significant ($p=0.07$) (data not shown).

Taken together, our data demonstrates that concomitant treatment of DBZ with gefitinib restores the sensitivity to gefitinib in EGFR$^{T790M/L858R}$ mice in vivo.

Dual Inhibition of EGFR and Notch Pathways Synergistically Decreases HES1 Expression In order to gain insights into the mechanism that triggered the gefitinib sensitivity in cells harboring the EGFR$^{T790M}$ gatekeeper mutation when combined with GSI, we took advantage of a gefitinib resistant human EGFR-driven LUAD cell line, PC9GR that harbor the EGFR$^{T790M}$ mutation (21).

First, we performed a proliferation curve of PC9GR with the same four treatments as in our in vivo experiment in EGFR$^{T790M/L858R}$ mice. As expected, gefitinib did not hamper the cell grow of PC9GR, while GSI treatment promoted only a mild effect in cell proliferation. Importantly, PC9GR cells treated with the combination of both DBZ and gefitinib showed impaired proliferation (data not shown). In addition, foci formation experiments showed that the combination of both treatments led to a very significant block in foci formation in PC9GR cells, while both gefitinib or GSI had only a minor effect in this experimental setting (data not shown). Of note, gefitinib was very efficient in both assays when used in the sensitive PC9 original cell line (data not shown).

In order to analyze the mechanism for this synergism, we performed RNA-seq gene expression profiling of PC9GR cells treated with the different combinations. We focused our efforts on mRNAs whose level of expression would change following the phenotype, almost no changes in GSI or gefitinib single treatments [fold discovery rate (FDR)

p<0.05; magnitude log 2 fold change ≤1.5-fold] but with a strong decrease in mRNA expression upon combining both treatments [FDR p<0.05; magnitude log 2 fold change ≤3-fold]. Remarkably, one among the only three genes that fit these stringent criteria was HES1 gene (data not shown). Indeed, results from our lab and others have previously shown an oncogenic role for HES1 in KRAS-driven LUAD (7,13). Hence, we decided to focus on this gene. First, to validate the transcriptional results, we analyzed the expression of N1ICD and HES1 proteins in PC9GR upon treatment with the different drug combinations. As expected, GSI (with or without gefitinib) induced the shut-off of N1ICD expression, and strikingly, levels of HES1 were very significantly reduced upon combination of GSI and gefitinib (FIG. 3d). The numbers of HES1 positive cells were very similar in DBZ-treated mice with or without gefitinib in the in vivo experiment in $EGFR^{T790M/L858R}$ mice (data not shown). Hence, and in an effort to investigate the potential relevance in vivo of the synergy we described above, we checked the levels of HES1 expression in the mice under the four treatments. As expected, intensity was reduced in GSI treated mice when compared to vehicle treated ones, regardless the presence or not of gefitinib (data not shown). Interestingly, there was a significant decrease in HES1 levels with the combination treated mice compared to GSI alone (data not shown), confirming and expanding our in vitro data.

Thus, in order to explore its potential relevance in this context, we treated PC9GR cells with a pool of siRNAs targeting HES1 mRNA (siHES1) with and without gefitinib. As expected, siHES1 treated PC9GR cells show decreased HES1 protein levels (data not shown). In this setting, siHES1 treated cells showed impaired proliferation when compared to the non-targeting siRNA (siNT) and, importantly, this phenotype was potentiated by the addition of gefitinib (data not shown).

Taken together, our data shows that the combination of GSI and gefitinib synergistically reduced the expression of the crucial LUAD protein HES1.

Pstat3 Directly Binds to the HES1 Promoter and Regulates HES1 Expression

Previous studies have shown a benefit when combining EGFR TKIs and Notch inhibitors in TKI sensitive cells, but the mechanism triggering this phenotype is not well understood (8-10). Even more, to our knowledge we are the first to report a re-sensitization to TKIs promoted by Notch inhibition in resistant cells expressing gatekeeper mutations. Hence, we rationalized that a common mechanism shared between different TKI inhibitor treatments could occur in LUAD cells regardless of their sensitivity or resistance to TKIs. Interestingly, it was previously described that treatment with either first generation (erlotinib) or second generation (afatinib) TKIs, leads to an increase in pSTAT3 protein levels (22-24), and this pSTAT3 increase is mediated by the induction of IL6R and FGFR signaling pathways promoted by the TKI (22,23). Consistently, the RNAseq performed previously in PC9GR cells showed that both IL6R and FGFR1 genes were upregulated upon gefitinib treatment with or without GSI (data not shown), and we validated these results by qPCR analysis (data not shown). Importantly, concomitant with the increased IL6R and FGFR1 mRNA expression, we observed increased STAT3 phosphorylation in PC9GR cells upon gefitinib treatment (data not shown). Hence, our data in the resistant PC9GR cells treated with gefitinib confirmed all previous observations (21-23).

pSTAT3 is a well-known transcriptional activator but it has been also described as a repressor for the murine Ubc13 promoter (25). Hence, we hypothesized that pSTAT3 might be inhibiting HES1 expression. Interestingly, sequence analyses of both human and murine Hes1 gene promoter harbors consensus sites for pSTAT3 (26), in close vicinity of the RBPJ sites (data not shown).

In order to test whether pSTAT3 might directly bind to the human HES1 promoter, we performed chromatin immunoprecipitation (ChIP) using an antibody against pSTAT3. As control, we also performed another ChIP with an antibody against NOTCH1 that is well known to bind to the HES1 promoter. As expected, we found a GSI-dependent NOTCH1 binding to the HES1 promoter either in vehicle or gefitinib treated cells (data not shown). Strikingly, we found that pSTAT3 could also bind to the HES1 promoter but only upon combination of gefitinib and GSI treatments (data not shown).

To check whether this pSTAT3 binding is critical for the decrease in HES1 levels, we tested the effect of STAT3 inhibition upon the different treatments in PC9GR cells. Consistent with our previous results (data not shown), the levels of HES1 protein were decreased in siNT treated cells upon combination of gefitinib and GSI (data not shown). As expected, siSTAT3 treated cells reduced both pSTAT3 and STAT3 levels but, more importantly, siSTAT3 treatment rescued the decrease in HES1 levels observed upon dual treatment of gefitinib and GSI (data not shown).

STAT3 plays a major oncogenic role in many cancer types (27). Interestingly, genetic studies in vivo have shown a tumor suppressive role in prostate cancer (28), and importantly, also in KRAS-driven LUAD (29). Hence, in an effort to extrapolate our mechanistic findings to the in vivo context as well as to genetic insult different to EGFR, we analyzed HES1 expression in two different cohorts of mice harboring $Kras^{G12D}$-driven tumors with intact or with genetic deletion of Stat3 gene. Of note, Stat3 genetic ablated tumors showed an increase in HES1 protein levels compared to their Stat3 WT counterparts (data not shown).

Taken together, our data shows that pSTAT3 is a negative regulator of HES1 expression.

Pharmacological Inhibition of γ-Secretase Re-Sensitizes LUAD Cells Harboring $EGFR^{C797S}$ Gatekeeper Mutation to Osimertinib As different TKIs are able to induce pSTAT3 levels in LUAD cells (22-24), we hypothesized that the mechanism we described above should work also with other TKIs. To test for this possibility, we took advantage of the PC9GROR cell line (previously generated from PC9GR), which shows resistance to both gefitinib and osimertinib. Of note, this PC9GROR harbor the gatekeeper mutation $EGFR^{C797S}$ (21).

PC9GR cells were totally unable to grow upon osimertinib treatment (data not shown). In contrast, the presence of $EGFR^{C797S}$ gatekeeper mutation allowed to PC9GROR to grow in the presence of osimertinib (FIG. 1A), still, osimertinib single treatment as well as GSI alone, induced a mild effect in cell proliferation compared to the untreated PC9GROR cells (FIG. 1A). Importantly, the combination of GSI and osimertinib showed a stronger antiproliferative effect than any other treatment (FIG. 1A).

Protein analysis by western blot in PC9GROR cells showed that osimertinib treatment induced an increase of pSTAT3 levels while GSI treatment abolished the generation of N1ICD (data not shown). Interestingly, the combination of GSI and osimertinib showed the lowest HES1 protein levels among the different treatments (data not shown).

In order to test for the re-sensitization to osimertinib in EGFR$^{C797S}$ mutant human LUAD cells in vivo, we grafted PC9GROR cells subcutaneously in mice. Two weeks after cell injection, mice were randomized into four treatment groups: control group, treated with vehicle; GSI group, treated with dibenzazepine (DBZ); treated with osimertinib; and treated with a combination of osimertinib and DBZ (OSI/DBZ). In this experimental setting single treatments did not produce any therapeutic benefit after 3 weeks of treatment (FIG. 1B).

Figure 1B:
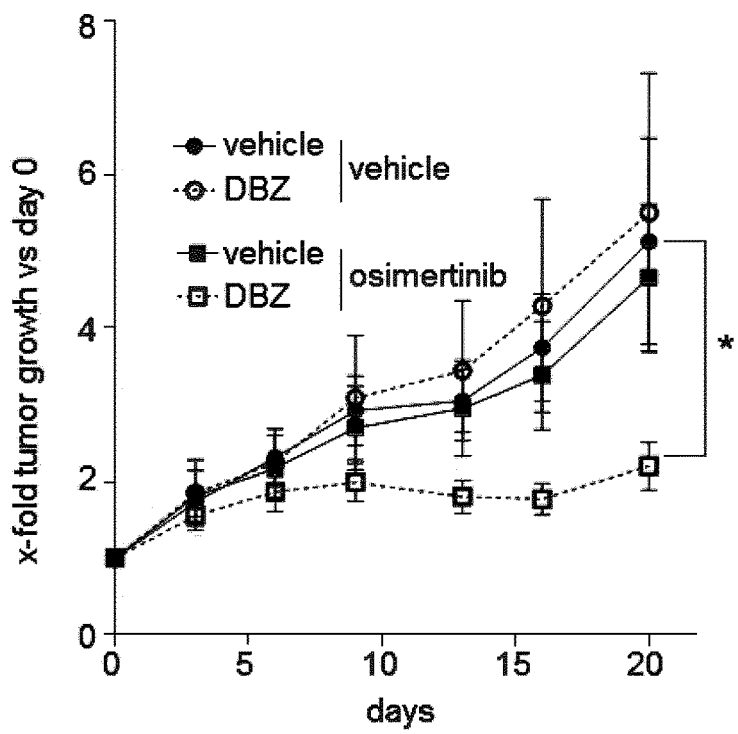

Importantly, the tumoral growth in OSI/DBZ treated mice was arrested (FIG. 1B). As observed before, we could not detect changes in the weight of animals among the different groups suggesting again the absence of undesired side effects in our treatments (data not shown). Finally, and as expected, the same osimertinib regime in mice with PC9GR xenografts showed a strong therapeutic effect (data not shown).

Taken together, our results demonstrate that human cells harboring the EGFR$^{C797S}$ gatekeeper mutation restore their sensitivity to osimertinib upon GSI treatment, confirming and expanding our previous observations.

EGFR$^{T790M/L858R}$-Driven LUAD Patient Derived Xenografts Become Sensitive to Gefitinib Upon γ-Secretase Inhibition In an effort to validate our findings in a clinically relevant setting, we developed a LUAD patient-derived xenograft (PDX) model carrying the same genetic mutations in EGFR than those harbored in our transgenic mouse model, EGFR$^{T790M/L858R}$.

We implanted the PDX subcutaneously in a group of mice and one week later we randomized them into four treatment groups: treated with vehicle, with dibenzazepine (DBZ), with gefitinib, and with a combination of gefitinib and DBZ (GEF/DBZ).

Figure 2A:
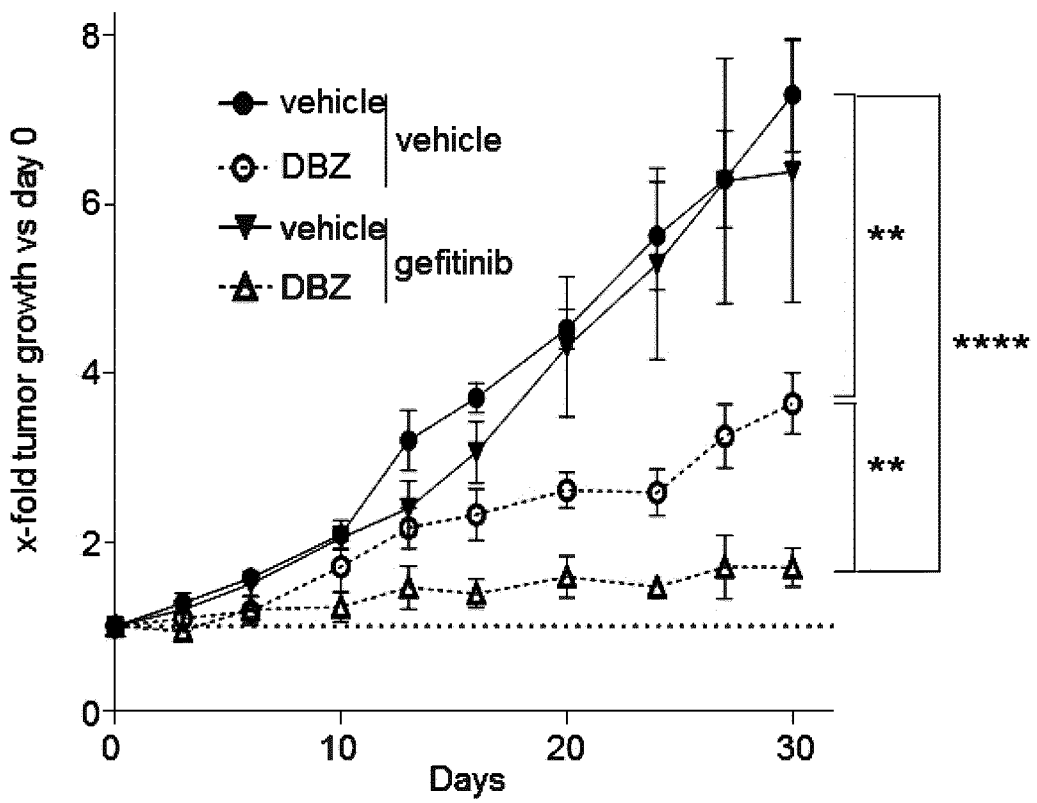

As expected, the gatekeeper mutation EGFR$^{T790M}$ conferred resistance to gefitinib (FIG. 2A). Interestingly, single treatment with DBZ showed some therapeutic benefit in this particular PDX, and importantly, the GEF/DBZ treated mice had almost totally blocked the tumor growth (FIG. 2A).

Hence, our therapeutic strategy also works in this clinically relevant preclinical model.

Hes1 Expression is Increased in EGFR Mutated Patients that Relapsed to TKI

Figure 2B:
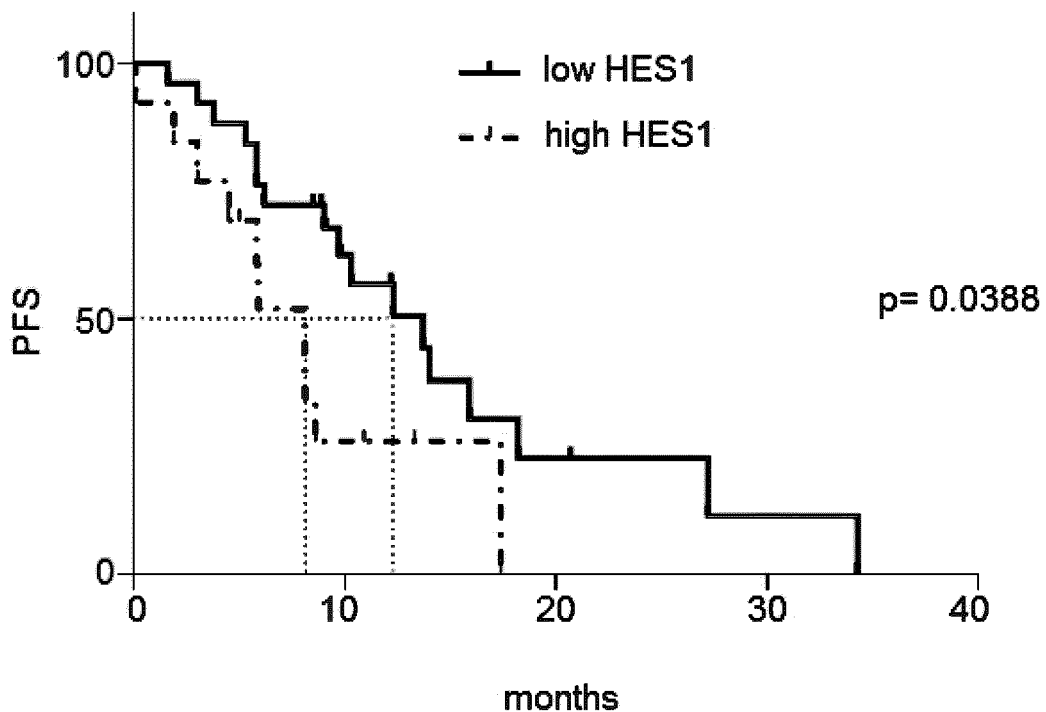

We have previously reported an inverse correlation between HES1 protein levels and survival in LUAD patients, confirming its important role in the human disease (7). Our current data highlights a key role for HES1 in resistance to EGFR TKI therapy. To corroborate this point, we analyzed a set of 40 EGFR mutated patients under TKI treatment for a correlation between progression free survival (PFS) and HES1 levels. Interestingly, we found that patients with low HES1 expression levels had a PFS of 13.7 months while those with high HES1 expression had a PFS of 8.1 months (p=0.038) (FIG. 2B). Even more, analysis of HES1 expression on tumor biopsies of 7 patients at the moment of diagnosis and after relapse showed an increased HES1 expression at the moment of relapse in seven patients while only one showed HES1 decrease (p=0.034) (data not shown).

Overall, our data in patients extend our previous observations, highlighting thus the critical role of HES1 in EGFR TKI relapse.

In Vitro Evaluation of the Synergism of Gefitinib and Nirogacestat Combinations

Using a γ-secretase inhibitor for research, DBZ, we regain sensitivity to gefitinib in murine and human lung adenocarcinoma cells harboring the EGFRT790M resistant mutation. In order to better translate our results into the clinical setting, we decided to repeat it using another γ-secretase inhibitor under clinical trials, nirogacestat (37).

Figures 3A, 3B:
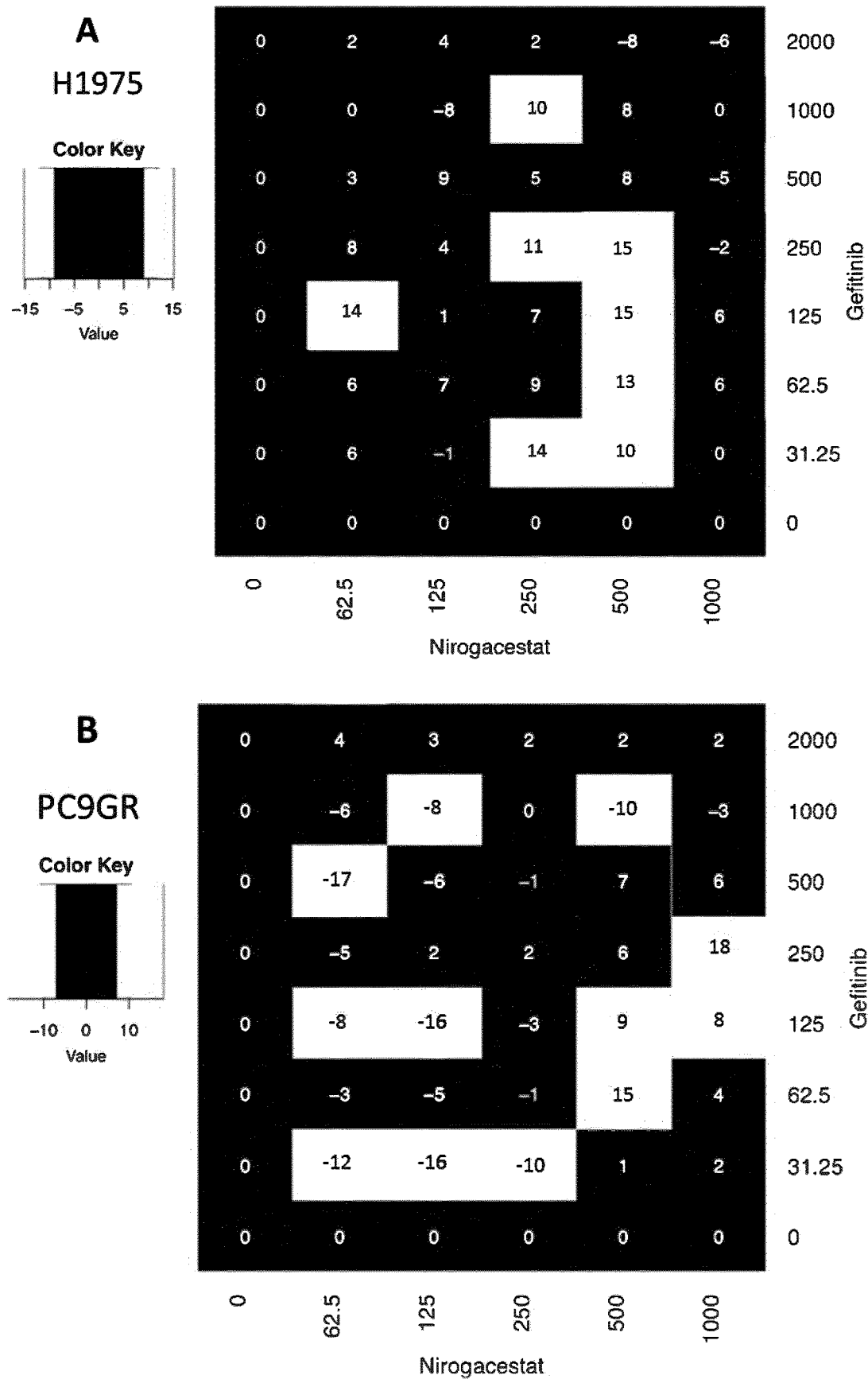

The interaction of gefitinib and nirogacestat was evaluated using a full-range dose matrix approach and SRB cytotoxicity tests for two-drug combinations in two molecularly characterized human lung adenocarcinoma cell lines harboring the gefitinib resistant mutation EGFRT790M, H1975 and PC9GR. Results are presented as values of the synergistic and antagonistic effects with positive and negative values respectively (FIG. 3A for 1975 and 3B for PC9GR). In both cases we showed a synergistic effect at around 500 nM of nirogacestat and between 62.5 nM and 250 nM of gefitinib.

In Vitro Treatment of Gefitinib and Nirogacestat Combinations

Figure 4:
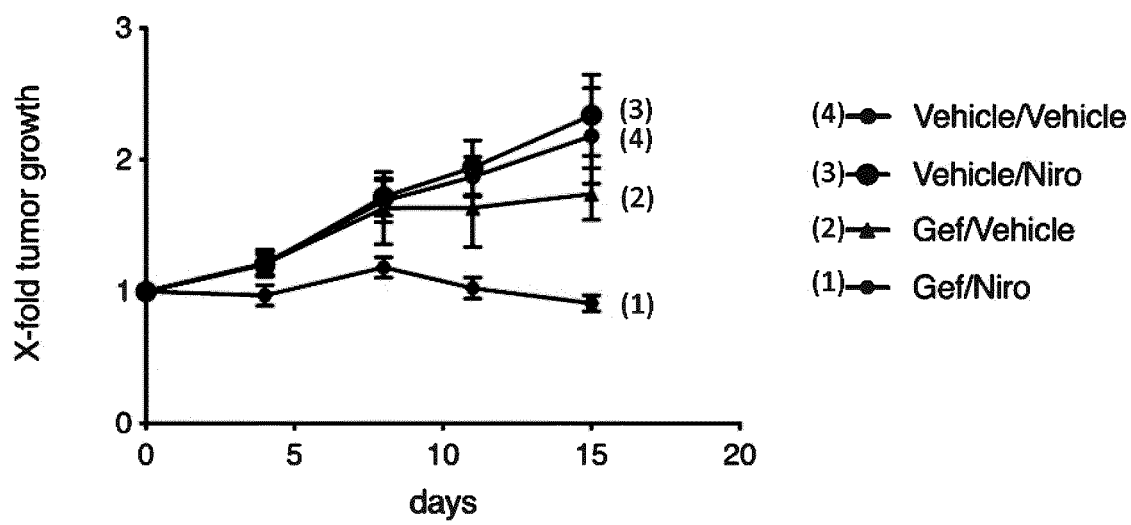

In order to test this synergy in vivo, we grafted PC9GR cells subcutaneously in nude mice, then two weeks later, we treated them with 50 mg/kg/day of nirogacestat or 10 mg/kg/day of gefitinib alone, or with a combination of both drugs during 2 weeks, 2 days a week. The effect on tumor growth inhibition of the combination treatment was significant against any other treatment (FIG. 4).

Taking together, our results provide strong preclinical evidence for the likely therapeutic benefit of treating TKI-resistant EGFR-driven lung adenocarcinoma patients harboring the resistant gatekeeper mutations EGFR$^{T790M}$ with a combination of Notch inhibitors and gefitinib.

CONCLUSION

Altogether, these results indicate that the Notch pathway plays a major role in EGFR-driven cancer biology (like lung cancer) and relapse to EGFR TKIs, providing a rationale to treat patients that become resistant to EGFR TKI with a combination of the same TKI and Notch inhibitors.

REFERENCES

Throughout this application, various references describe the state of the art to which this invention pertains. The disclosures of these references are hereby incorporated by reference into the present disclosure.

1. Herbst R S, Heymach J V, Lippman S M. Lung cancer. N Engl J Med 2008; 359(13):1367-80 doi 359/13/1367 [pii]10.1056/NEJMra0802714.
2. Reck M, Heigener D F, Mok T, Soria J C, Rabe K F. Management of non-small-cell lung cancer: recent developments. Lancet 2013; 382(9893):709-19 doi 10.1016/S0140-6736(13)61502-0.
3. Tan C S, Gilligan D, Pacey S. Treatment approaches for EGFR-inhibitor-resistant patients with non-small-cell lung cancer. Lancet Oncol 2015; 16(9):e447-59 doi 10.1016/S1470-2045(15)00246-6.
4. Janne P A, Yang J C, Kim D W, Planchard D, Ohe Y, Ramalingam S S, et al. AZD9291 in EGFR inhibitor-resistant non-small-cell lung cancer. N Engl J Med 2015; 372(18):1689-99 doi 10.1056/NEJMoa1411817.
5. Thress K S, Paweletz C P, Felip E, Cho B C, Stetson D, Dougherty B, et al. Acquired EGFR C797S mutation mediates resistance to AZD9291 in non-small cell lung cancer harboring EGFR T790M. Nat Med 2015; 21(6): 560-2 doi 10.1038/nm.3854.
6. Ntziachristos P, Lim J S, Sage J, Aifantis I. From fly wings to targeted cancer therapies: a centennial for notch signaling. Cancer Cell 2014; 25(3):318-34 doi 10.1016/j.ccr.2014.02.018.

7. Maraver A, Fernandez-Marcos P J, Herranz D, Canamero M, Munoz-Martin M, Gomez-Lopez G, et al. Therapeutic Effect of gamma-Secretase Inhibition in Kras(G12V)-Driven Non-Small Cell Lung Carcinoma by Derepression of DUSP1 and Inhibition of ERK. Cancer Cell 2012; 22(2):222-34 doi S1535-6108(12)00263-2 [pii]10.1016/j.ccr.2012.06.014.
8. Hu S, Fu W, Li T, Yuan Q, Wang F, Lv G, et al. Antagonism of EGFR and Notch limits resistance to EGFR inhibitors and radiation by decreasing tumor-initiating cell frequency. Sci Transl Med 2017; 9(380) doi 10.1126/scitranslmed.aag0339.
9. Konishi J, Yi F, Chen X, Vo H, Carbone D P, Dang T P. Notch3 cooperates with the EGFR pathway to modulate apoptosis through the induction of bim. Oncogene 2010; 29(4):589-96 doi 10.1038/onc.2009.366.
10. Arasada R R, Amann J M, Rahman M A, Huppert S S, Carbone D P. EGFR blockade enriches for lung cancer stem-like cells through Notch3-dependent signaling. Cancer Res 2014; 74(19):5572-84 doi 10.1158/0008-5472.CAN-13-3724.
11. Li D, Shimamura T, Ji H, Chen L, Haringsma H J, McNamara K, et al. Bronchial and peripheral murine lung carcinomas induced by T790M-L858R mutant EGFR respond to HKI-272 and rapamycin combination therapy. Cancer Cell 2007; 12(1):81-93 doi 10.1016/j.ccr.2007.06.005.
12. Tichelaar J W, Lu W, Whitsett J A. Conditional expression of fibroblast growth factor-7 in the developing and mature lung. J Biol Chem 2000; 275(16):11858-64.
13. Baumgart A, Mazur P K, Anton M, Rudelius M, Schwamborn K, Feuchtinger A, et al. Opposing role of Notch1 and Notch2 in a Kras-driven murine non-small cell lung cancer model. Oncogene 2014 doi 10.1038/onc.2013.592.
14. Licciulli S, Avila J L, Hanlon L, Troutman S, Cesaroni M, Kota S, et al. Notch1 is required for Kras-induced lung adenocarcinoma and controls tumor cell survival via p53. Cancer Res 2013; 73(19):5974-84 doi 10.1158/0008-5472.CAN-13-1384.
15. Zheng Y, de la Cruz C C, Sayles L C, Alleyne-Chin C, Vaka D, Knaak T D, et al. A rare population of CD24(+)ITGB4(+)Notch(hi) cells drives tumor propagation in NSCLC and requires Notch3 for self-renewal. Cancer Cell 2013; 24(1):59-74 doi 10.1016/j.ccr.2013.05.021.
16. Wu Y, Cain-Hom C et al. Therapeutic antibody targeting of individual Notch receptors. Nature 2010; 464(7291):1052-7 doi 10.1038/nature08878.
17. Rivera-Torres J, Guzman-Martinez G, Villa-Bellosta R, Orbe J, Gonzalez-Gomez C, Serrano M, et al. Targeting gamma-secretases protect against angiotensin II-induced cardiac hypertrophy. J Hypertens 2015; 33(4):843-50 doi 10.1097/HJH.0000000000000463.
18. van Es J H, van Gijn M E, Riccio O, van den Born M, Vooijs M, Begthel H, et al. Notch/gamma-secretase inhibition turns proliferative cells in intestinal crypts and adenomas into goblet cells. Nature 2005; 435(7044):959-63 doi 10.1038/nature03659.
19. Arteaga C L, Engelman J A. ERBB receptors: from oncogene discovery to basic science to mechanism-based cancer therapeutics. Cancer Cell 2014; 25(3):282-303 doi 10.1016/j.ccr.2014.02.025.
20. Takebe N, Miele L, Harris P J, Jeong W, Bando H, Kahn M, et al. Targeting Notch, Hedgehog, and Wnt pathways in cancer stem cells: clinical update. Nature reviews Clinical oncology 2015; 12(8):445-64 doi 10.1038/nrclinonc.2015.61.
21. Mancini M, Gal H, Gaborit N, Mazzeo L, Romaniello D, Salame T M, et al. An oligoclonal antibody durably overcomes resistance of lung cancer to third-generation EGFR inhibitors. EMBO Mol Med 2018; 10(2):294-308 doi 10.15252/emmm.201708076.
22. Kim S M, Kwon O J, Hong Y K, Kim J H, Solca F, Ha S J, et al. Activation of IL-6R/JAK1/STAT3 signaling induces de novo resistance to irreversible EGFR inhibitors in non-small cell lung cancer with T790M resistance mutation. Mol Cancer Ther 2012; 11(10):2254-64 doi 10.1158/1535-7163.MCT-12-0311.
23. Lee H J, Zhuang G, and al. Drug resistance via feedback activation of Stat3 in oncogene-addicted cancer cells. Cancer Cell 2014; 26(2):207-21 doi 10.1016/j.ccr.2014.05.019.
24. Codony-Servat C, Codony-Servat J, Karachaliou N, Molina M A, Chaib I, Ramirez J L, et al. Activation of signal transducer and activator of transcription 3 (STAT3) signaling in EGFR mutant non-small-cell lung cancer (NSCLC). Oncotarget 2017; 8(29):47305-16 doi 10.18632/oncotarget.17625.
25. Zhang H, Hu H, Greeley N, Jin J, Matthews A J, Ohashi E, et al. STAT3 restrains RANK- and TLR4-mediated signalling by suppressing expression of the E2 ubiquitin-conjugating enzyme Ubc13. Nat Commun 2014; 5:5798 doi 10.1038/ncomms6798.
26. Darnell J E, Jr. STATs and gene regulation. Science 1997; 277(5332):1630-5.
27. Yu H, Lee H, Herrmann A, Buettner R, Jove R. Revisiting STAT3 signalling in cancer: new and unexpected biological functions. Nat Rev Cancer 2014; 14(11):736-46 doi 10.1038/nrc3818.
28. Pencik J, Schlederer M, Gruber W, Unger C, Walker S M, Chalaris A, et al. STAT3 regulated ARF expression suppresses prostate cancer metastasis. Nat Commun 2015; 6:7736 doi 10.1038/ncomms8736.
29. Grabner B, Schramek D, Mueller K M, Moll H P, Svinka J, Hoffmann T, et al. Disruption of STAT3 signalling promotes KRAS-induced lung tumorigenesis. Nat Commun 2015; 6:6285 doi 10.1038/ncomms7285.
30. Palomero T, Sulis M L, Cortina M, Real P J, Barnes K, Ciofani M, et al. Mutational loss of PTEN induces resistance to NOTCH1 inhibition in T-cell leukemia. Nat Med 2007; 13(10):1203-10 doi 10.1038/nm1636.
31. Maraver A, Serrano M. Notching up a new therapeutic strategy for Non-Small Cell Lung Carcinoma (NSCLC). Oncotarget 2012 doi 671 [pii].
32. Johnson D E and al. Targeting the IL-6/JAK/STAT3 signalling axis in cancer. Nature reviews Clinical oncology 2018; 15(4):234-48 doi 10.1038/nrclinonc.2018.8.
33. Soria J C, Ohe Y, Vansteenkiste J, Reungwetwattana T, Chewaskulyong B, Lee K H, et al. Osimertinib in Untreated EGFR-Mutated Advanced Non-Small-Cell Lung Cancer. N Engl J Med 2018; 378(2):113-25 doi 10.1056/NEJMoa1713137.
34. Gold K A, Byers L A, Fan Y H, Fujimoto J, Tse W H, Lee J J, et al. A phase I/II trial combining erlotinib with gamma secretase inhibitor RO4929097 in advanced non-small cell lung cancer (NSCLC). Journal of Clinical Oncology 2013; 31(15_suppl):8104-doi 10.1200/jco.2013.31.15_suppl.8104.
35. Fabbrizio E, El Messaoudi S, Polanowska J, Paul C, Cook J R, Lee J H, et al. Negative regulation of transcription by the type II arginine methyltransferase PRMT5. EMBO Rep 2002; 3(7):641-5 doi 10.1093/embo-reports/kvf136.

36. Calvayrac O, Mazieres J, Figarol S, Marty-Detraves C, Raymond-Letron I, Bousquet E, et al. The RAS-related GTPase RHOB confers resistance to EGFR-tyrosine kinase inhibitors in non-small-cell lung cancer via an AKT-dependent mechanism. EMBO Mol Med 2017; 9(2):238-50 doi 10.15252/emmm.201606646.

37. Kummar S, O'Sullivan Coyne G, Do K T, Turkbey B, Meltzer P S, Polley E, et al. Clinical Activity of the gamma-Secretase Inhibitor PF-03084014 in Adults With Desmoid Tumors (Aggressive Fibromatosis). J Clin Oncol. 2017; 35(14):1561-9.

Bellavia Diana, Rocco Palermo, Maria Pia Felli, and al. Notch signaling as a therapeutic target for acute lymphoblastic leukemia. Expert opinion on therapeutic targets, 2018 vol. 22, no. 4, 331-342.

Ristorcelli Elodie & Dominique Lombardo. Targeting Notch signaling in pancreatic cancer. Expert Opin. Ther. Targets (2010).

Li Yiwei, Ma'in Y Maitah, and al. Targeting the Hedgehog signaling pathway for cancer therapy. Expert Opin. Ther. Targets (2012).

The invention claimed is:

1. A method for ameliorating a cancer, wherein the cancer is a lung cancer having at least one mutation in EGFR that includes EGFRC797S, comprising administering to a subject in need thereof a therapeutically effective amount of a tyrosine-kinase inhibitor (TKI) against epidermal growth factor receptor (EGFR) and an inhibitor of the Notch signaling pathway, wherein the TKI is osimertinib or rociletinib, wherein the inhibitor of the Notch signaling pathway is nirogacestat or dibenzazepine (DBZ).

2. The method of claim 1, wherein the tyrosine-kinase inhibitor (TKI) against epidermal growth factor receptor (EGFR) and the inhibitor of the Notch signaling pathway, are administered i) as a combined preparation for simultaneous administration, ii) separately or iii) sequentially.

3. A therapeutic composition comprising a tyrosine-kinase inhibitor (TKI) against epidermal growth factor receptor (EGFR) and an inhibitor of the Notch signaling pathway, wherein the TKI is osimertinib or rociletinib, wherein the inhibitor of the Notch signaling pathway is nirogacestat or dibenzazepine (DBZ).

4. A method for predicting the survival time of and ameliorating cancer in a subject suffering from lung cancer, wherein the lung cancer has at least one mutation in EGFR that includes EGFRC797S, comprising the steps of: i) determining the expression level of HES1 in a biological sample obtained from the patient to identify the subject as having a short survival time when the expression level is equal to or higher than a predetermined reference value, and ii) administering to the subject a therapeutically effective amount of a combination of tyrosine-kinase inhibitor (TKI) against epidermal growth factor receptor (EGFR) and an inhibitor of the Notch signaling pathway, wherein the TKI is osimertinib or rociletinib, wherein the inhibitor of the Notch signaling pathway is nirogacestat or dibenzazepine (DBZ).

* * * * *